(12) United States Patent  (10) Patent No.: US 8,994,666 B2
Karpfinger  (45) Date of Patent: Mar. 31, 2015

(54) TACTILE TOUCH-SENSING INTERFACE SYSTEM

(76) Inventor: Colin J. Karpfinger, San Francisco, CA (US)

( * ) Notice: Subject to any disclaimer, the term of this patent is extended or adjusted under 35 U.S.C. 154(b) by 987 days.

(21) Appl. No.: 12/977,919

(22) Filed: Dec. 23, 2010

(65) Prior Publication Data

US 2011/0157056 A1  Jun. 30, 2011

Related U.S. Application Data

(60) Provisional application No. 61/289,741, filed on Dec. 23, 2009.

(51) Int. Cl.
*G06F 3/041* (2006.01)
*G06F 3/0488* (2013.01)
*G06F 3/02* (2006.01)
*G06F 3/0338* (2013.01)

(52) U.S. Cl.
CPC ............ *G06F 3/0488* (2013.01); *G06F 3/0202* (2013.01); *G06F 3/0338* (2013.01); *G06F 3/041* (2013.01); *G06F 3/04886* (2013.01); *G06F 2203/04809* (2013.01)
USPC ....................................... 345/173

(58) Field of Classification Search
USPC ................................. 345/156–184
See application file for complete search history.

(56) References Cited

U.S. PATENT DOCUMENTS

| | | | |
|---|---|---|---|
| 4,931,782 A | 6/1990 | Jackson | |
| 4,992,631 A * | 2/1991 | Gee | 200/5 A |
| 5,498,843 A * | 3/1996 | Date et al. | 200/6 A |
| 5,621,196 A * | 4/1997 | Nishijima et al. | 200/6 A |
| 5,719,361 A * | 2/1998 | Lee | 200/1 B |
| 5,902,972 A * | 5/1999 | Nestor et al. | 200/1 B |
| 6,162,999 A * | 12/2000 | Ishikawa et al. | 200/6 A |
| 6,344,619 B1 * | 2/2002 | Yamasaki et al. | 200/6 A |
| 6,441,753 B1 * | 8/2002 | Montgomery | 341/34 |
| 6,776,546 B2 | 8/2004 | Kraus et al. | |
| 6,812,415 B1 * | 11/2004 | Priesemuth | 200/5 R |
| 7,436,391 B2 * | 10/2008 | Bilger et al. | 345/156 |
| 7,489,296 B2 * | 2/2009 | Nishino et al. | 345/157 |
| 7,659,885 B2 | 2/2010 | Kraus et al. | |
| 8,487,872 B2 * | 7/2013 | McAlindon | 345/161 |
| 2003/0184524 A1 | 10/2003 | Stohrer et al. | |
| 2004/0212598 A1 | 10/2004 | Kraus et al. | |
| 2006/0085757 A1 | 4/2006 | Andre et al. | |
| 2006/0256090 A1 * | 11/2006 | Huppi | 345/173 |
| 2008/0238879 A1 * | 10/2008 | Jaeger et al. | 345/173 |
| 2010/0079403 A1 | 4/2010 | Lynch et al. | |
| 2010/0097327 A1 | 4/2010 | Wadsworth | |
| 2010/0309130 A1 | 12/2010 | Zhao et al. | |

* cited by examiner

*Primary Examiner* — William Boddie
*Assistant Examiner* — Carolyn R Edwards
(74) *Attorney, Agent, or Firm* — Dicke, Billig & Czaja, PLLC

(57) ABSTRACT

A user-configurable, tactile interface system that includes mechanical buttons with several mounting options, and several methods to interface with touch-sensing devices. A user can activate a touch on a touch sensing device by pressing a physical pad, which may be textured, or raised.

20 Claims, 27 Drawing Sheets

TACTILE TOUCH-SENSING INTERFACE SYSTEM

CROSS-REFERENCE TO RELATED APPLICATIONS

This application claims priority under 35 U.S.C. §119(e)(1) to U.S. Provisional Patent Application Ser. No. 61/289,741, filed Dec. 23, 2009, entitled "Tactile Touch-Sensing Interface System", and the entire teachings of which are incorporated herein by reference.

BACKGROUND

Many devices use a touch-sensing system as the primary form of input. This method brings along some inherent disadvantages, which the present disclosure remedies. One of these disadvantages is the lack of tactile feedback. The touch-sensing systems are often associated with a smooth touch-receiving surface, lacking any texture or surface irregularities that the user can feel.

Touch-sensing systems can take various forms, and generally entail one or more touch-receiving sensors or switches that are selectively actuated by a user and electrically connected to a processor or similar device programmed to perform certain operation(s) in response to a signal received from the touch-receiving sensor(s). The touch-receiving sensor(s) are presented to a user in various formats, but are typically located on, below, or within a display screen, located to sense a touch at one (or more) designated touch coordinates (or areas) along the display screen. For example, the touch-receiving sensor can be located immediately at (or below) the designated touch coordinates; alternatively, a series of touch-receiving sensors can be provided that collectively operate to recognize a touch at the designated touch coordinates. Various icons, symbols, pictures, characters (e.g., alphanumeric), etc., are displayed on the display screen at or "over" the designated touch coordinates so that a user viewing the display screen understands that by touching the display screen in the area of the indicia (and thus actuating the touch-receiving sensor(s)), a desired operation will be performed. By way of example, FIG. 1 is a simplified view of a hand-held device 50 including a display screen 52. Several touch-receiving sensors 54, 56 are associated with the display screen 52 to define two designated touch coordinates along the display screen 52, and are shown in phantom in FIG. 1 (i.e., the touch-receiving sensors 54, 56 are not readily visible to a viewer). In FIG. 2, the device 50 is operated to display indicia 60, 62 "over" each of the touch-receiving sensors 54, 56. It will be understood that in other common configurations (e.g., capacitive touch systems described below), the touch-receiving sensors 54, 56 are not located immediately below the designated touch coordinates (i.e., coordinates of the indicia 60, 62), but instead are collectively located to respond to a touch at the designated touch coordinates. Regardless, the indicia 60, 62 effectively serve as virtual buttons, controllers, or keyboards, providing the user with an immediate visual clue as to what type of operation will be prompted should the user touch the display screen in the region of the indicia.

Touch-receiving sensors are commonly of the "capacitive touch" variety. These touch-receiving sensors sense the electrical properties of a user's finger to determine if the user has touched the screen, and if so, where the touch occurred. It should be noted that these properties do not have to be present directly on top of the display screen to be sensed. For example, it is common practice to have a clear film (e.g., a screen protector) or other non-conductive material placed over the display screen; capacitive touch sensor systems are configured such that these non-conductive layers do not interfere with intended sensor operation. Another type of touch-receiving sensor is known as "resistive touch". This type is simpler electrically, since it only requires mechanical pressure to register a touch, and does not require any certain electrical properties to be present.

In the case of a "capacitive touch" sensing device, interfacing a button keypad is non-trivial. The pressure of a user's finger on a button alone is not enough for the system to sense a touch. Instead, the electrical properties of the user's finger must be communicated to, or replicated on, the touch-sensing system.

There are several devices on the market today that use touch-sensing systems as the main format for user input, such as the Apple iPhone, the Apple iPod Touch, and the Microsoft Zune HD. The iPhone presents a use environment that will be familiar to many readers, and will be used for examples. In no way is the present disclosure intended to be restricted to this device, and in no way are the examples meant to suggest any kind of preferred form or application. On the iPhone, the display device and the touch-sensing system are the same size and shape, and the touch-sensing system is overlaid directly on top of the display. Therefore it may be helpful to use the term 'touch screen' to refer to the touch-sensing system and the display device.

In many cases, the touch-sensing system and display device act in conjunction to mimic hardware input systems such as buttons. For example, on the iPhone users can input data using an on-screen virtual keyboard. The keyboard is displayed on the screen, and users can input or "select" a character by touching any of the displayed keys. The device can sense when the user has touched one of the displayed keys, and the system can respond with visual and/or auditory feedback to the user.

The flat and smooth touch screen inherently provides a small level of tactile feedback to the user, and for many end-use applications, this is acceptable. However, the minimal feedback provided by the touch screen is noticeably different from the tactile feedback provided by a physical, spring-loaded button, such as commonly provided with hand-held video game controllers. In video games, tactile and sensory feedback can be especially important. There are added restraints on the user to provide the correct input at the correct time. For example, if a user's input is incorrect, the game may require them to repeat a section of the game. This higher cost of failure can result in added frustration to the user. In some cases, a user may be able to use his or her own visual feedback to verify that their fingers are touching the correct positions. However, with the added timing restrictions of video games, and the need to respond quickly to auditory or visual feedback, the user can rarely take his eyes from the display device.

For example, the Apple iPhone allows users to play video game applications by interfacing with the touch screen. To give users a familiar experience, the hand-held device 50 will often display a control pad representation 70 on the touch screen 52 in conjunction with a particular gaming application, as shown in FIG. 3. The control pad representation 70 will "show" virtual buttons to the user in a fashion analogous to controllers commonly used with stand-alone video game systems. One common feature includes four touch-receiving sensors or buttons arranged underneath the control pad representation 70 that is otherwise has the visual appearance of a plus sign shaped piece, and is typically known as a directional pad. The directional pad 70, or D-Pad, often controls the direction of something in the game. Other individual button representations 72, 74 are also often displayed, and are typically circular. Once again, the representations 70-74 are only displayed on the video display device 50, and do not physically exist on device 50, and thus are referred to as "virtual" buttons, controllers, keyboards, etc. The device 50 responds to a sensed touch at one of the virtual buttons, controllers, etc., in some prescribed manner.

In light of the above, a need exists for systems and methods for improving a user's tactile interaction with a touch-sensing system, and in particular with touch-sensing systems provided with hand-held devices in performing video game applications and/or other applications such as keyboards.

SUMMARY

In some aspects, the present disclosure provides systems and methods of interfacing with or actuating touch sensors in a way that retains the advantages of physical buttons. The present disclosure is comprised of individual physical members, or buttons, that give tactile feedback to the user, and can communicate with a touch-sensing input system. In one embodiment, these members communicate to the touch-sensing device directly, without any external control circuitry.

In this embodiment, each member, a single unit, functions both as the tactile feedback device, and also as the touch generating device. The touch generating device is the interface that provides the sensed touch on the touch-sensing device. In other words, it is the unit that causes the touch-sensitive device to sense that it was touched. This definition will be used throughout.

In addition, one embodiment is designed in such a way that allows the user to position the members themselves. This allows the user to configure the members to interface with existing software ad-hoc. In other words, the present disclosure may be used with software that was not designed with the intent of interfacing with the present disclosure. This is important, as it allows use of the present disclosure in more situations.

DETAILED DESCRIPTION

Figure 4:
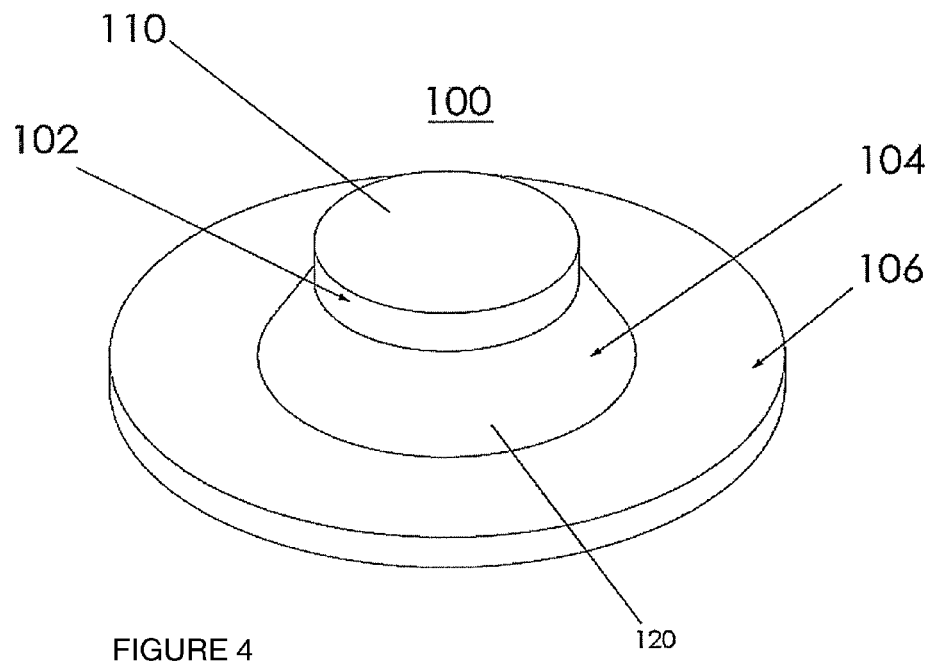
FIG. 4 is a perspective view of a button assembly in accordance with principles of the present disclosure.
Figure 5:
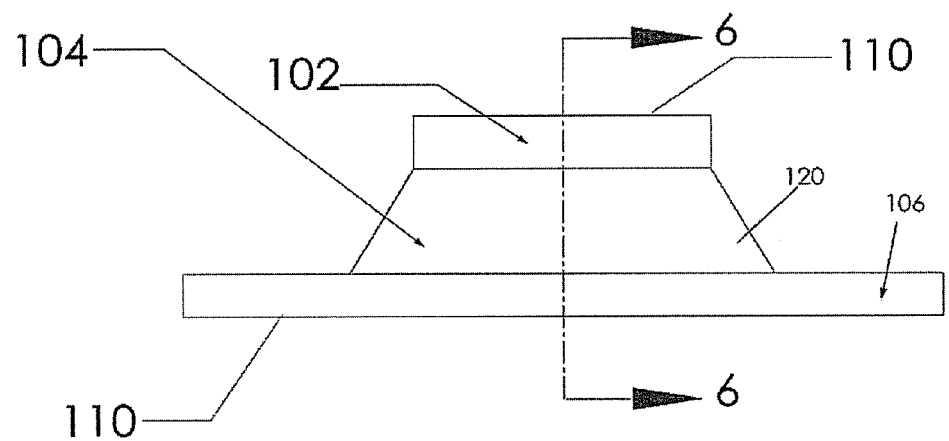
FIG. 5 is a side view of the button assembly of FIG. 4.
Figure 6:
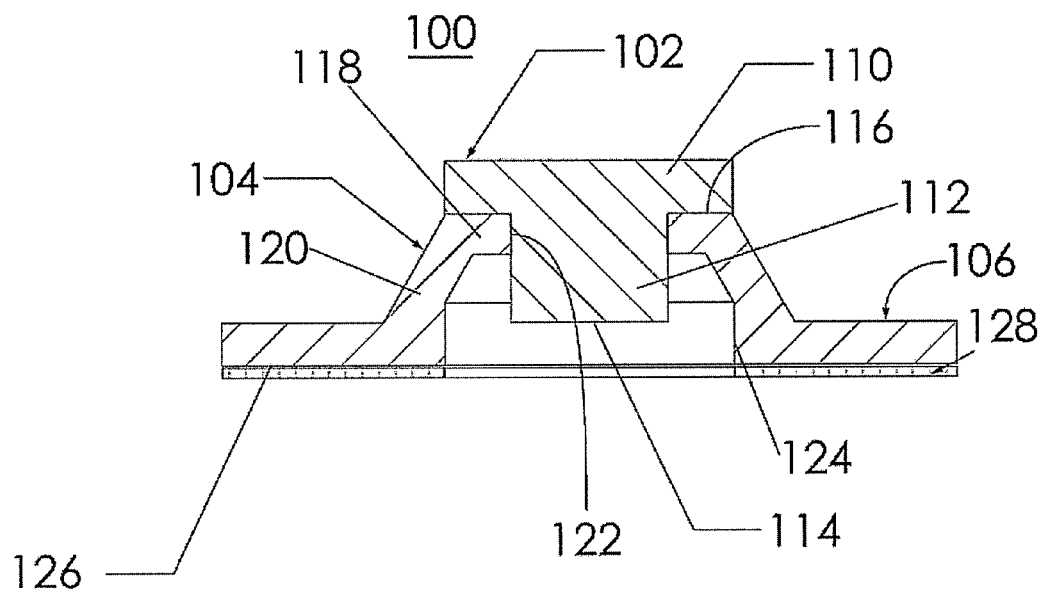
FIG. 6 is a cross-sectional view of the button assembly of FIG. 5, taken along the line 6-6 and in a normal state.

One embodiment of a button assembly 100 in accordance with principles of the present disclosure and useful with a touch-sensing system is shown in FIGS. 4-6. The button assembly 100 includes a button body or insert 102, a frame 104 and a base 106. As used throughout this disclosure, the term "button" is a general reference to, and broadly encompasses any conventional user input format such as keyboard keys, controller buttons, roller ball, directional pads, toggle switches, etc. Details on the various components are provided below. In general terms, however, the frame 104 retains the button body 102 above the base 106 (relative to the orientation of FIGS. 4-6) in manner permitting the button body 102 to be selectively moved toward the base 106 in response to a user's pressing force upon the button body 102. When the pressing force is removed, the frame 104 (or optionally other components) causes the button body 102 to revert back to the position of FIGS. 4-6. The base 106 facilitates selective mounting of the button assembly 100 to a touch screen at a location desired by the user. With this construction, the button assembly 100 can be mounted over a virtual controller, button, etc., otherwise displayed on a touch screen, and serves to prompt actuation of a corresponding touch-receiving sensor (s) while simultaneously providing the user with the tactile sensation or feedback highly akin to a physical, spring-loaded control pad or button.

The button body 102 can assume various forms, and generally includes or defines a head 110 and a foot 112 as best shown in FIG. 6. The foot 112 extends from the head 110, terminating in a contact face 114. The contact face 114 selectively interacts (e.g., contacts) with a touch-screen surface or other surface as described below during use of the button assembly 100, and thus can be relatively flat as shown. Other configurations (e.g., curved or arcuate) are also envisioned. In some constructions, the button body 102 is sized and/or shaped for assembly to the frame 104, for example by forming the foot 112 to have a smaller outer dimension (e.g., diameter) that that of the head 110 to define a ledge 116. Alternatively, the button body 102 can have other shapes and/or constructions differing from those implicated by FIGS. 4-6.

The button body 102 can be formed as integral, homogenous structure, for example from plastic, metal, rubber, etc. Where the button assembly 100 is intended to be employed with capacitive-type touch sensing systems, the button body 102 is formed of an electrically conductive material (such as carbon impregnated silicone) with embodiments in which the button body 102 is a homogenous structure. An electrically non-conductive material (or electrically conductive material) can be used for the button body 102 with resistive-type touch sensing systems.

Figure 7:
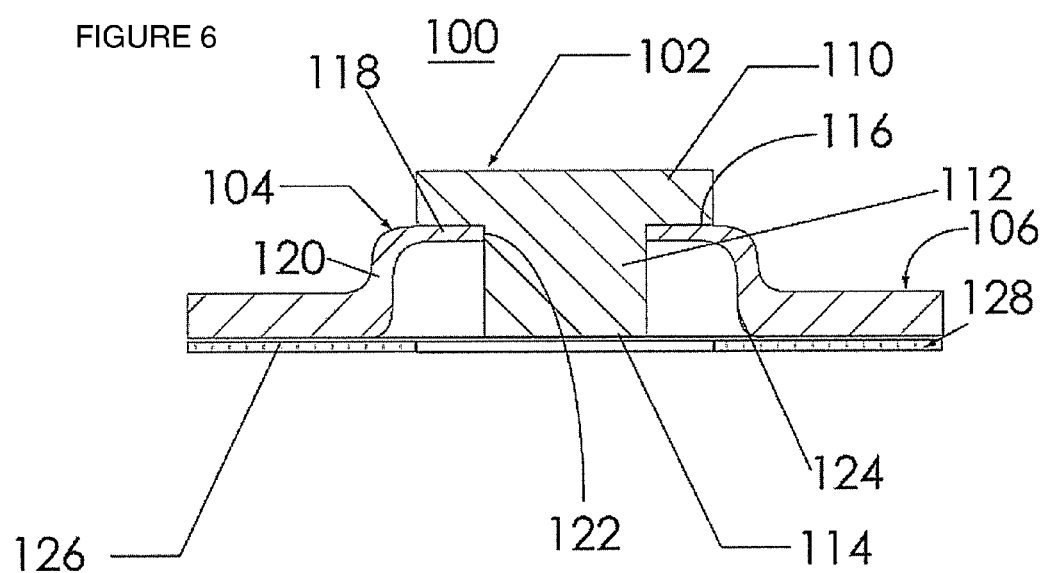
FIG. 7 is a cross-sectional view of the button assembly of FIG. 5 in a depressed state.

The frame 104 is configured to capture the button body 102, and in some embodiments is elastically deformable to permit resilient deflection of the button assembly 100 as described below. With this in mind, the frame 104 defines a rim 118 and an annular shoulder 120. The rim 118 forms an aperture 122 sized to frictionally receive and retain the foot 112 of the button body 102. The annular shoulder 120 extends from the rim 118 and is connected to the base 106. In this regard, the annular shoulder 120 can have a web-like form, with a material and thickness of the frame 104 being selected to permit the annular shoulder 120 to deflect from a normal or natural state of FIGS. 4-6 to a depressed or deflected state shown in FIG. 7 in response to a user-applied force upon the button body 102, and self-return to the normal state upon removal of the user-applied force. In some embodiments, the frame 104, and in particular the annular shoulder 120, is formed of a rubber-like material, such as silicone rubber, that provides the desired resiliency. The annular shoulder or webbing 120, in addition to base 106, can also be made of an optically clear silicone to minimize visual obstruction of the surface to which the assembly 100 is mounted.

The user force required to press the button body 102 from the normal state (FIG. 6) to the depressed state (FIG. 7) is a function of a thickness of the annular shoulder 120. By increasing the thickness, a greater amount of force is required. Along these same lines, in some embodiments, the shoulder 120 is configured to generate an audible and/or tactile "click" noise during forced transition from the normal state to the depressed state, duplicating the "click" reaction commonly found with physical buttons of gamepads, keyboards, and other devices. Due to a shape of the annular shoulder 120, the force (i.e., downward force on the button body 102) required to initiate deformation of the shoulder 120 (from the normal state) is greater than the force necessary to continue deflection to the depressed state (i.e., once the shoulder 120 begins to deflect, it more readily transitions to the depressed state). As a result, once a sufficient initial force is applied, the button body 102 rapidly moves to the depressed state, resulting in a "click" as the contact face 114 contacts the surface to which the assembly is mounted. In other embodiments, the button assembly 100 can include other features (e.g., spring, living hinge, etc.) that permit downward movement of the button body 102 relative to the base 106 in response to a user-applied pressing force, and self-return of the button assembly 100 to the normal state shown.

Returning to FIGS. 4-6, the base 106 can have a ring-like shape, and projects radially outwardly from the annular shoulder 120. Other perimeter shapes (regular or irregular) are equally acceptable. Regardless, the base 106 forms a passage 124 that is axially aligned with the button body 102 upon final assembly. As described below, the passage 124 is sized and shaped to permit the button body 102, and in particular the contact face 114, to contact a component located below the base 106 (relative to the orientation of FIGS. 4-6) in the pressed state.

The base 106 can, in some constructions, be integrally or homogeneously formed with the frame 104 (e.g., a singularly molded body) and thus can be a rubber-like material. Alternatively, the base 106 and the frame 104 can be separately formed and subsequently assembled. In any event, the base 106 defines a mounting face 126 adapted for assembly to a separate component, such as a touch-screen. In this regard, the button assembly 100 can further include an adhesive layer 128 on the mounting face 126. The adhesive layer 128 can be a pressure sensitive adhesive. Alternatively, other materials, such as a clear polished silicone rubber, are also acceptable. These and other materials can also be employed for the button body 102, the frame 104, and the base 106, resulting in a washable product that is efficiently manufacturable. In yet other embodiments, the material of the base 106 creates an inherent tackiness at the mounting face 126 such that the adhesive layer 128 can be eliminated. In related embodiments, the base 106 (and the optional adhesive layer 128) are substantially translucent or clear. For example, where at least the base 106, and in particular the mounting face 126, is a clear polished silicone rubber, the mounting face 126 will be a tacky surface that sticks well to a separate flat surface (such as a touch screen). The button assembly 100 can incorporate other features that facilitate mounting to a touch screen. For example, a static-charged material can be employed for the layer 128, providing static cling-type mounting. Alternatively, a suction effect can be generated at the passage 124 when pressing the button assembly 100 on to a touch screen. In yet other constructions, two or more of the above-described mounting features are combined. For example, a material with inherent tackiness can be formed in a shape that generates the suction effect.

Construction of the button assembly 100 includes connecting the button body 102 to the frame 104, for example via frictional capturing of the foot 112 within the aperture 122. Optionally, an adhesive can be employed to effectuate a more robust or permanent connection. As best shown in FIG. 6, the ledge 116 nests against the rim 118; with this but one acceptable arrangement, a force applied to the head 110 is directly transferred to the frame 104 via the ledge 116/rim 118 interface.

Figure 2:
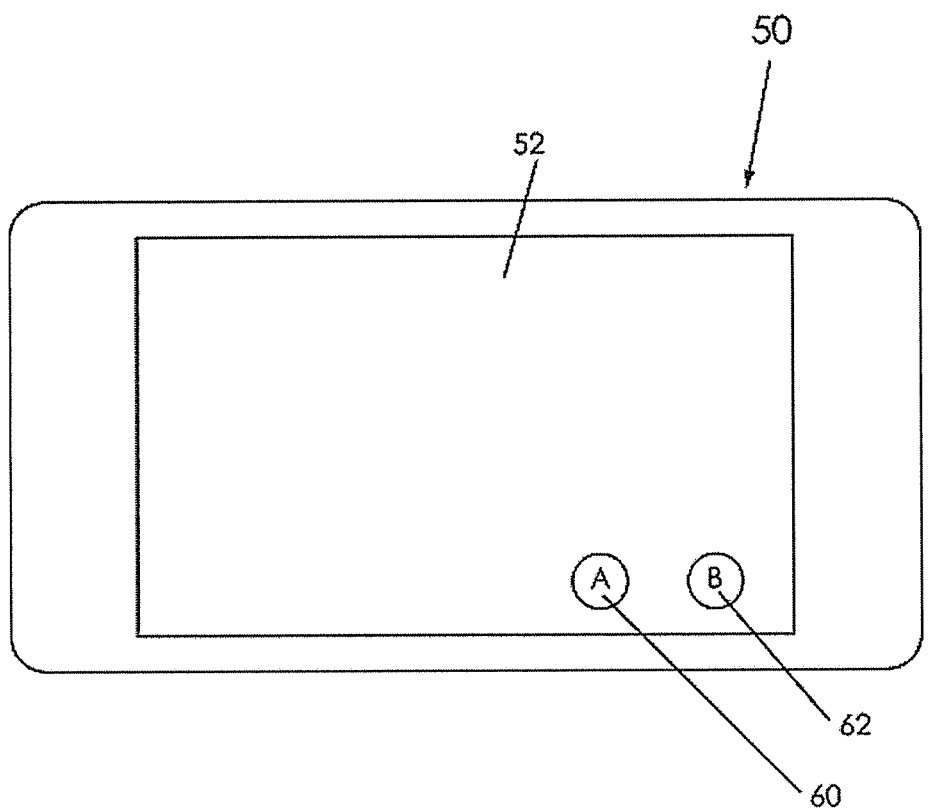
FIG. 2 is a top plan view of the device of FIG. 1 and illustrating virtual buttons being displayed thereon.
Figure 3:
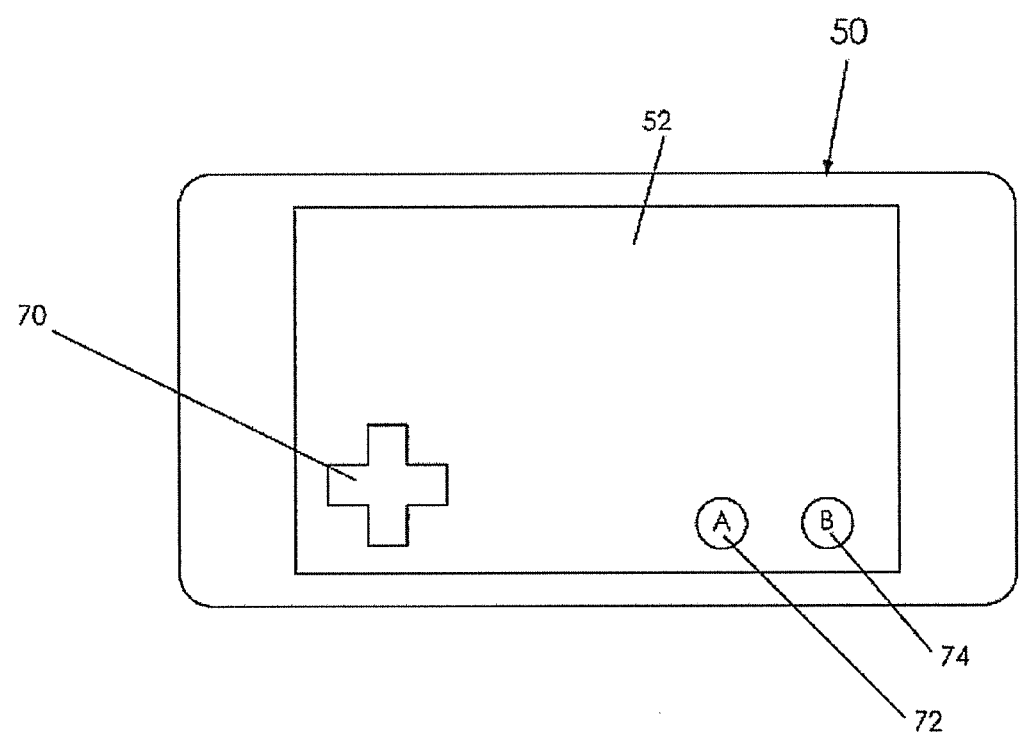
FIG. 3 is a top plan view of another display of virtual controllers.
Figure 8:
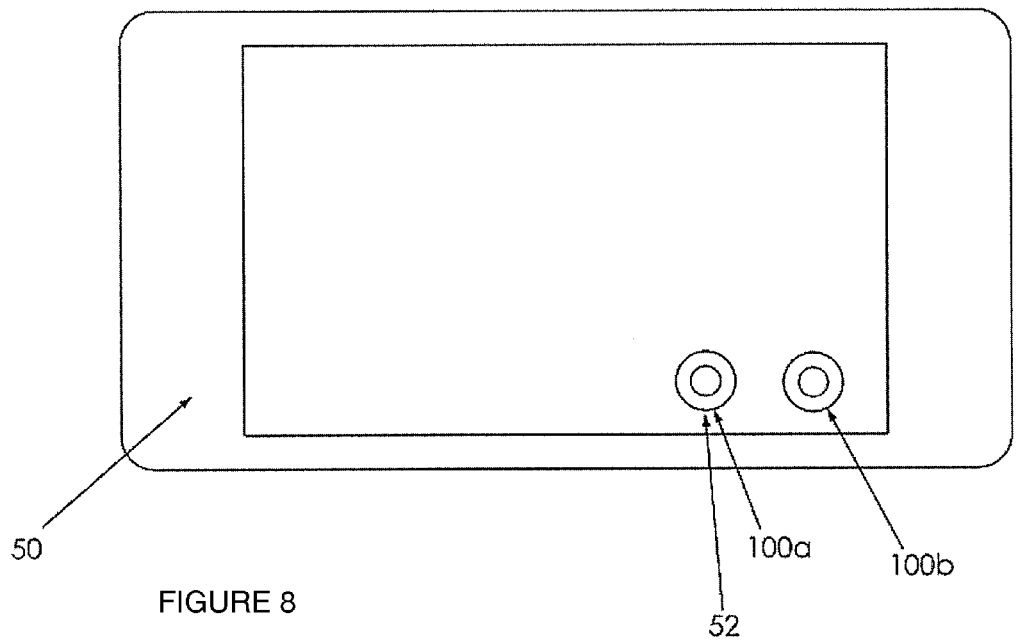
FIG. 8 is a simplified plan view of two of the button assemblies of FIG. 4 applied to a touch sensitive device.
Figure 9:
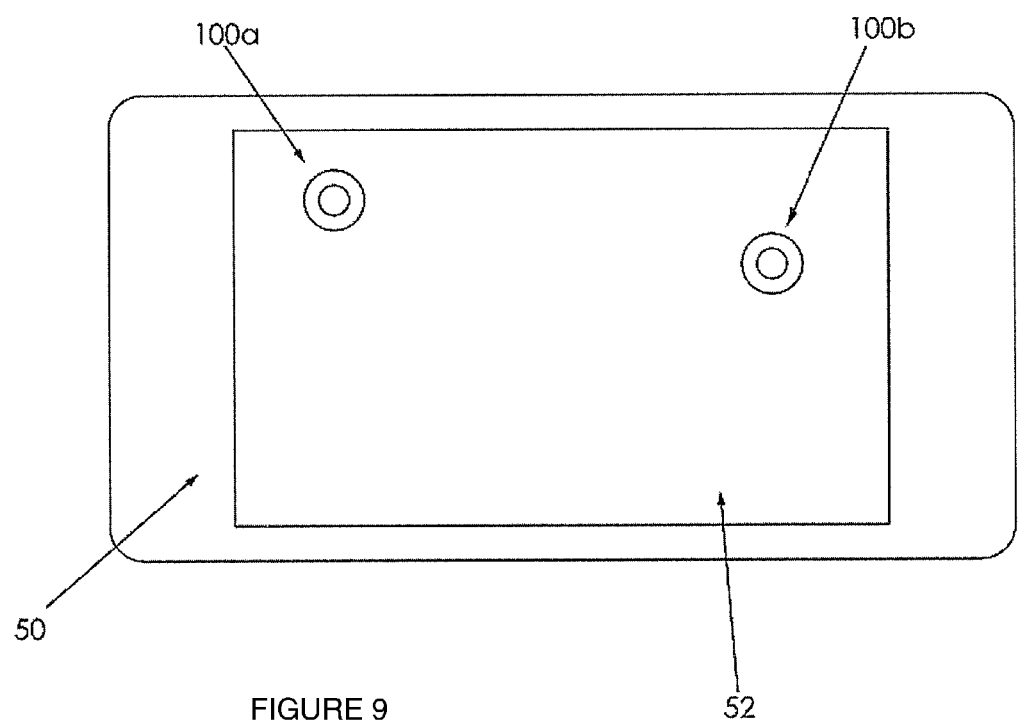
FIG. 9 is a top plan view of two of the button assemblies of FIG. 4 applied to a touch sensing system in a different arrangement.

Prior to use, the button assembly 100 can be provided to a user in various formats. For example, where the user desires to temporarily use the button assembly 100 to play a video game on a hand-held, touch-sensing system based device, the user can have one or more of the button assemblies 100 with him or her (e.g., a small bag containing the button assemblies 100); under these circumstances, the user simply retrieves the desired number of button assemblies 100 and applies them to desired locations along the touch screen. By way of example, FIG. 2 described above illustrates the touch screen 52 displaying virtual buttons 54, 56. In FIG. 8, a first button assembly 100a is applied over the first virtual button 54 and a second button assembly 100b is applied over the second virtual button 56. Once again, application or mounting of the button assemblies 100a, 100b to the touch screen 52 can be accomplished in multiple fashions (e.g., adhesive, static cling, suction effect, etc.). Regardless, the user freely chooses the location along the touch screen 52 at which the button assemblies 100a, 100b are applied. Thus, where the particular game (or other application) being run by the hand-held device 50 locates virtual button(s) at a location or locations differing from those of FIG. 2, the user can easily position the button assembly or assemblies 100 over the so-displayed virtual buttons (and thus over the desired touch coordinates associated with each virtual button). FIG. 9 illustrates another arrangement of the button assemblies 100a, 100b to the touch screen 52 as selected by the user. It will be understood that the arrangements of FIGS. 8 and 9 are in no way limiting; depending upon the particular application, one, two, or more of the button assemblies 100 will be employed.

Figure 10:
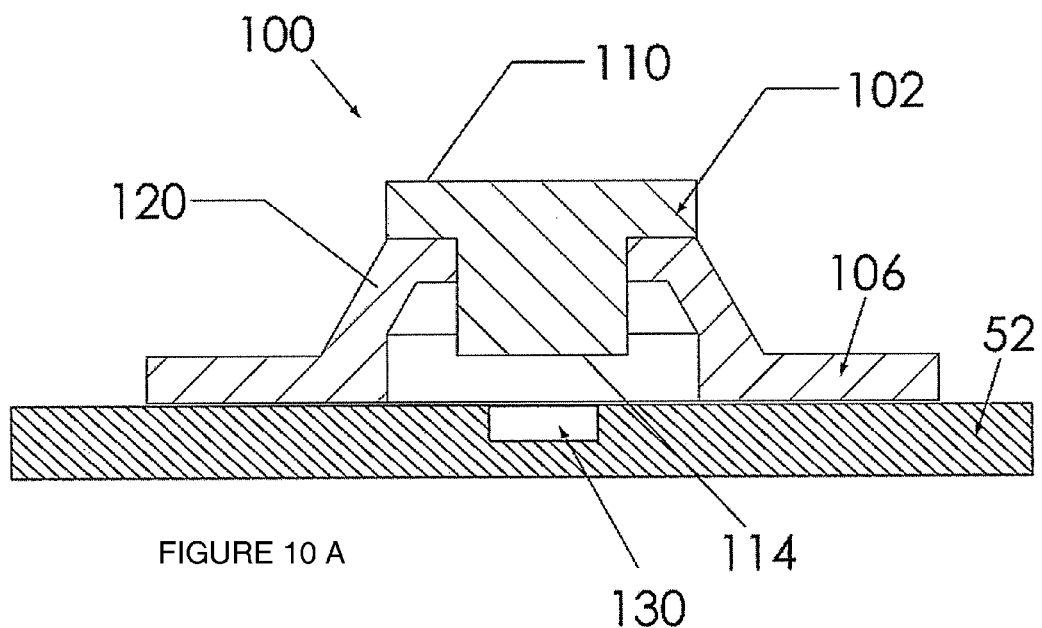
FIGS. 10A and 10B are cross-sectional views illustrating use of the button assembly of FIG. 4 relative to a display screen.
Figure 10:
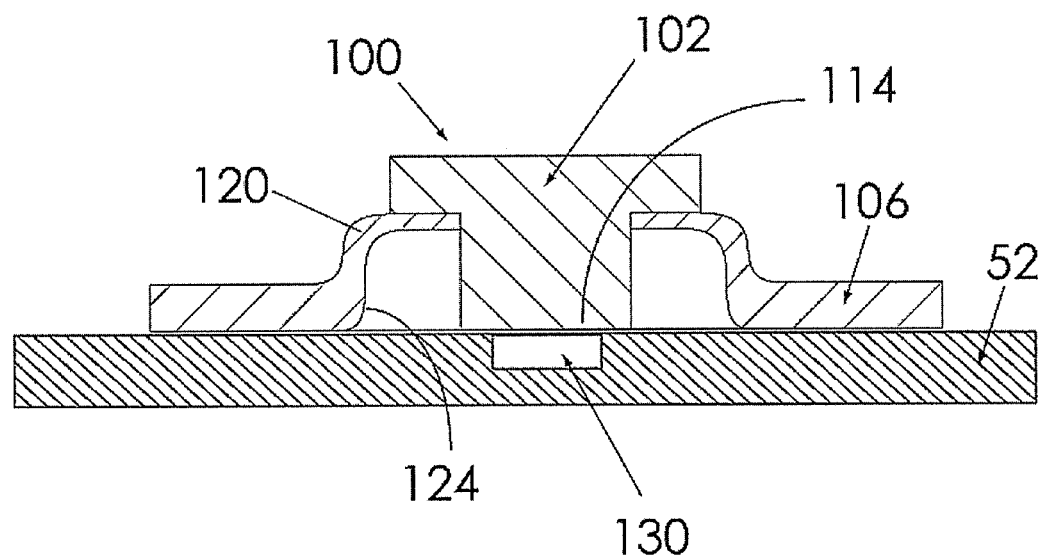

To effectuate a touch-related prompt or actuation on to the touch screen 52, the user simply presses down on button body 102 of the desired button assembly 100a, 100b. For example FIGS. 10A and 10B illustrate the button assembly 100 mounted to the touch screen 52 in a normal state (FIG. 10A) and a depressed state (FIG. 10B). In the normal state, the button body 102, and in particular the contact face 114, is retained above (i.e., spaced from) the touch screen 52, and in particular a touch-receiving sensor 130 (shown in block form) carried thereby. In response to a user-applied pressing force placed upon the head 110, the annular shoulder 120 elastically deforms and the button body 102 is allowed to move toward the touch screen 52 as shown in FIG. 10B. In some embodiments, this action generates an audible and/or tactile "click" as described above. The contact face 114 is directed through the passage 124 in the base 106 and contacts or interfaces with the touch screen 52/touch-receiving sensor 130. Thus, the depressed state of FIG. 10B replicates a user touch that can be recognized by the touch-receiving sensor 130. For example, with a resistive-type touch-receiving sensor 130, the contact face 114 applies a force that is sensed or received by the touch-receiving sensor 130. With a capacitive-type touch-receiving sensor 130, the electrical properties of the user's finger are transmitted from the head 110, through the button body 102, and to the contact face 114 that in turn transmits the electrical properties to the touch-receiving sensor 130, it being understood that with capacitive touch sensors, the sensor 130 need not be located directly below the desired touch coordinates as otherwise depicted in FIGS. 10A and 10B. Further, the button body 102 does not need to be connected to an electrical ground or common ground as the sensor 130. Instead, the conductive element(s) of the button assembly 100 do not need to conduct to a common element other than the touch-sensing surface of the touch screen 52; the human body inherently has electrical properties that alter a signal present on or detected by the capacitive-type touch-receiving sensor. Finally, the button body 102 does not have to conduct all the way down to the touch screen 52, but rather down to just a certain level. Thus, a clear film screen protector (not shown) can be disposed between the assembly 100 and the touch screen 52 without affecting performance.

Regardless of the particular touch-sensor technology, while the shoulder 120 will readily deflect from the normal state of FIG. 10A to the depressed state of FIG. 10B, a discernable resistance to the user-applied force is generated and is perceived by the user. Thus, operation of the button assembly 100 provides a tactile sensation to the user, highly akin to a conventional, spring-biased button.

When the user is done playing the game (or otherwise utilizing the application on the hand-held device 50 giving rise to the need for the button assembly 100), the button assembly 100 is simply removed from the touch screen 52. The button assembly 100 can be stored for later use and/or discarded.

While the button assembly 100 has been described as including the button body 102 has an integral or homogenous structure, other configurations are also envisioned. For example, in an alternative embodiment, the button body 102 is omitted. The aperture 122 formed by the frame 104 remains open, or a thin element extended across the aperture 122. Regardless, when the frame 104 is applied over the desired touch coordinates on the touch screen 52, the user's finger (not shown) can pass through the frame 104 or otherwise be brought into sufficient proximity to the touch screen 52 to register a touch event. As part of this action, the shoulder 120 will deflect as described above, generating the desired tactile sensation and optionally the audible and/or tactile "click".

Figure 11:
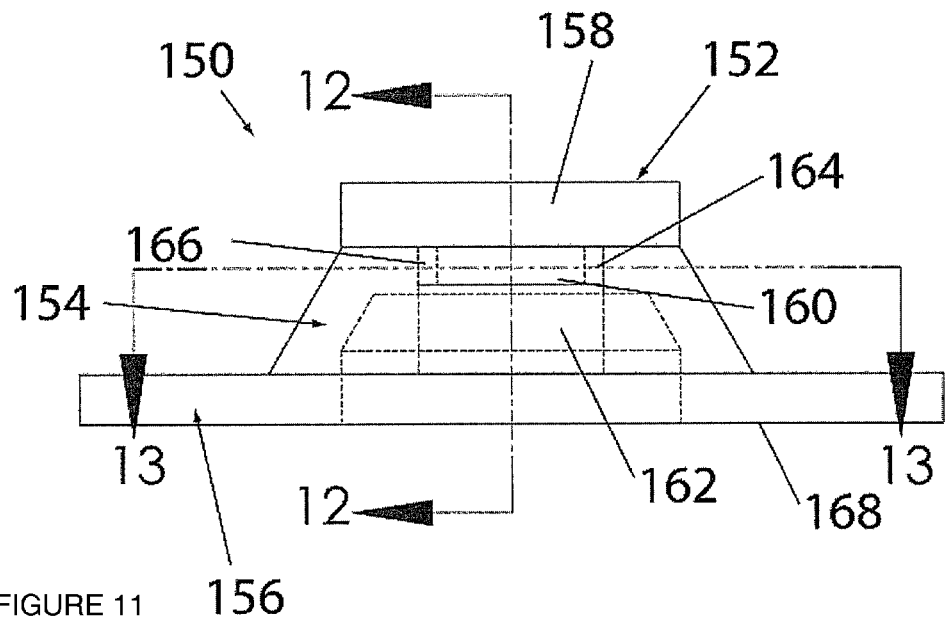
FIG. 11 is a side view of another button assembly in accordance with principles of the present disclosure.
Figure 12:
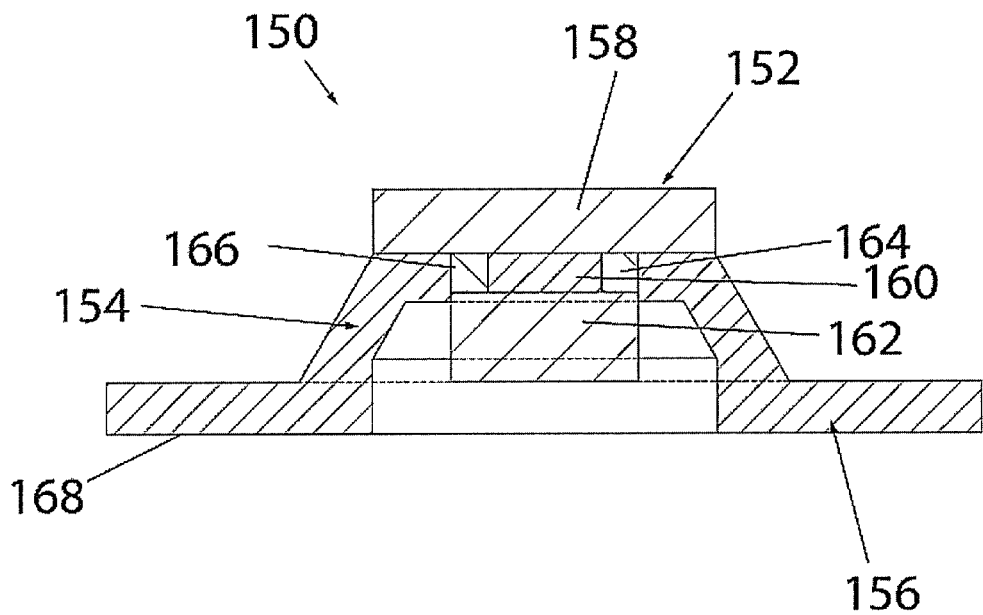
FIG. 12 is a cross-sectional view of the button assembly of FIG. 11, taken along the line 12-12.
Figure 13:
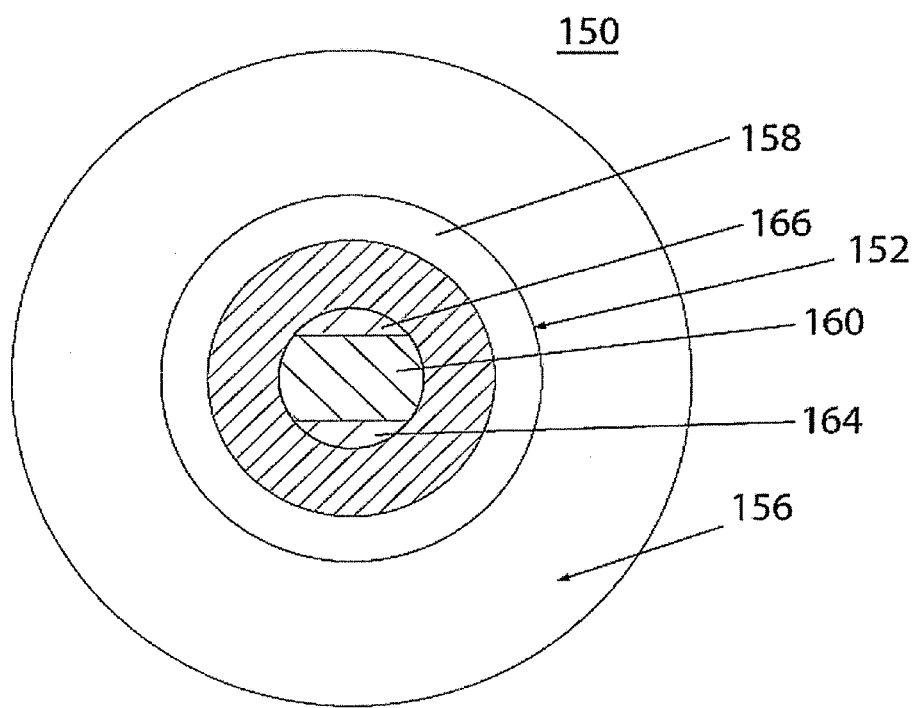
FIG. 13 is a cross-sectional view of the button assembly of FIG. 11, taken along the line 13-13.

FIGS. 11-13 illustrate another alternative button assembly 150 highly useful with capacitive-type touch-sensing systems and akin to the button assembly 100 described above. The button assembly 150 includes a button body 152, a frame 154, and a base 156. The frame 154 and the base 156 can be identical to the frame 104 (FIG. 4) and the base 106 (FIG. 4) described above. The button body 152 is akin to the button body 102 (FIG. 4) described above, but incorporates additional components. More particularly, and with specific reference to FIGS. 12 and 13, the button body 152 includes a head 158, a capacitive element 160 and a conductive body 162. The capacitive element 160 is mounted to an underside of the head 158, and has or exhibits at least some capacitance, resistance and inductance. The capacitive element 160 is electrically coupled to the conductive body 162 by terminals 164, 166. Finally, the conductive body 162 forms a contact face 168.

The button assembly 150 can selectively generate an electrical "touch" to a capacitive-type touch-receiving sensor apart from any electrical "property" of a user's finger via the capacitive element 160 and the conductive body 162. As a point of reference, replicating a user touch with a physical button in a manner that is registered by a capacitive-type touch-receiving sensor is non-trivial. The pressure of a user's finger on the button alone is not enough for the sensor to detect an intended touch. Instead, electrical properties akin to those of the human body must be communicated to, or replicated at, the designated touch coordinates with which the capacitive touch sensor is associated. The embodiments of FIGS. 11-13, as well as other embodiments described elsewhere, provide this effect without requiring direct or indirect electrical connection between the user's finger and the touch screen. Thus, the head 158 can be formed of any desired electrically non-conductive material (e.g., plastic), and can have an appearance and/or "feel" more closely akin to common user interface designs (e.g., keyboards, controllers, etc.).

Use of the button assembly 150 is highly akin to previous embodiments, with a user selectively applying the button assembly 150 to a desired location along a touch display. To effectuate a "touch" or actuation of the touch-receiving sensor(s) associated with the desired touch coordinates over which the button assembly 150 is disposed, the user simply presses down on the head 158. The frame 154 resiliently deflects, permitting downward movement of the button body 152 into the base 156 until the contact face 168 contacts (or is in close proximity to) the touch screen. Optionally, the button assembly 150 generates the audible and/or tactile "click" as described above. A capacitance maintained by the capacitive element 160 is conducted to the conductive body 162 via the terminals 164, 166, such that the contact face 168 can transfer an electrical charge on to the corresponding touch-receiving sensor(s); the touch-receiving sensor(s), in turn, interprets or "senses" the contact, prompting the operation or action desired by the user. Upon removal of the user-applied pressing force, the frame 154 self-reverts to the normal state as previously described, with the contact face 168 no longer "actuating" the designated touch coordinates or the corresponding touch-receiving sensor(s).

Figure 14A:
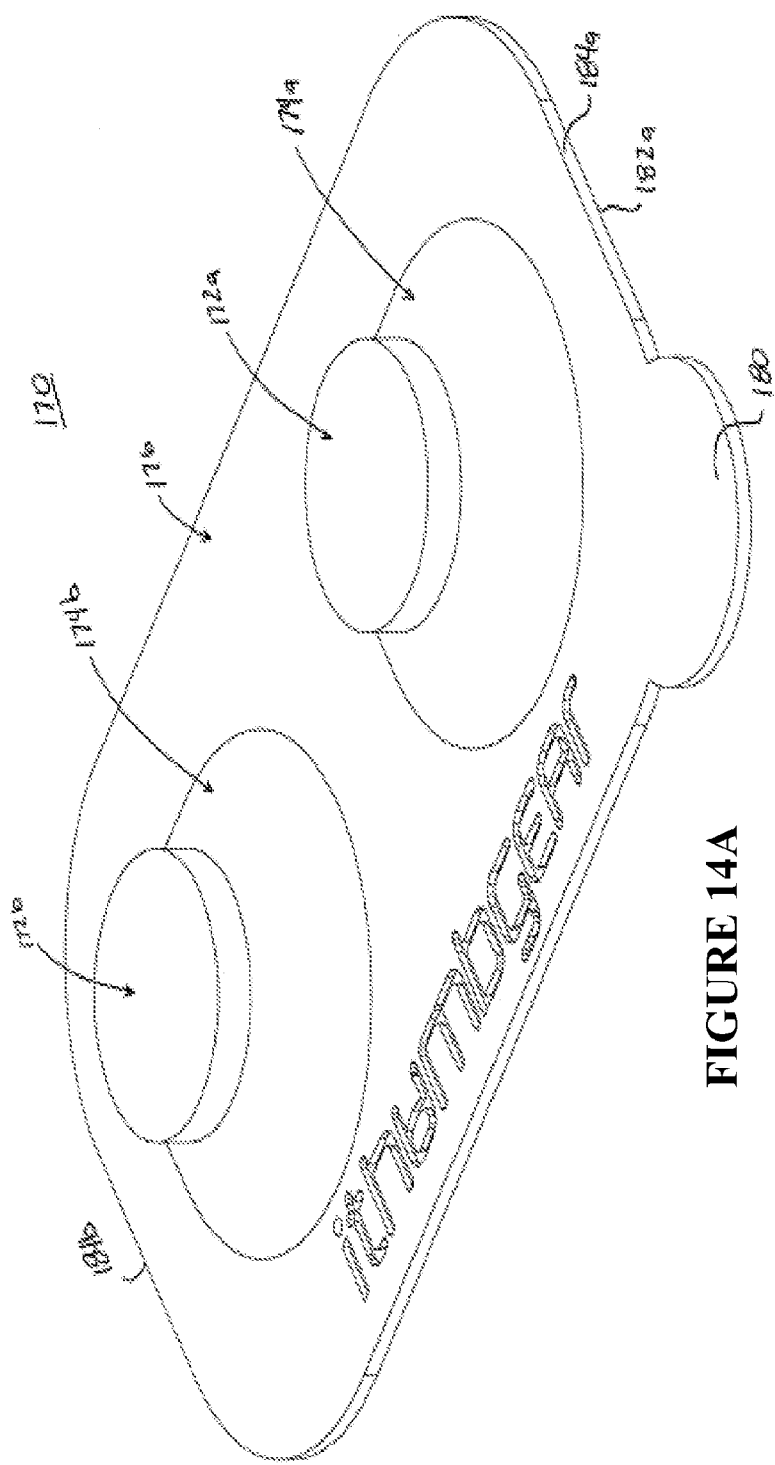
FIG. 14A is a perspective view of another button assembly in accordance with principles of the present disclosure.
Figure 14:
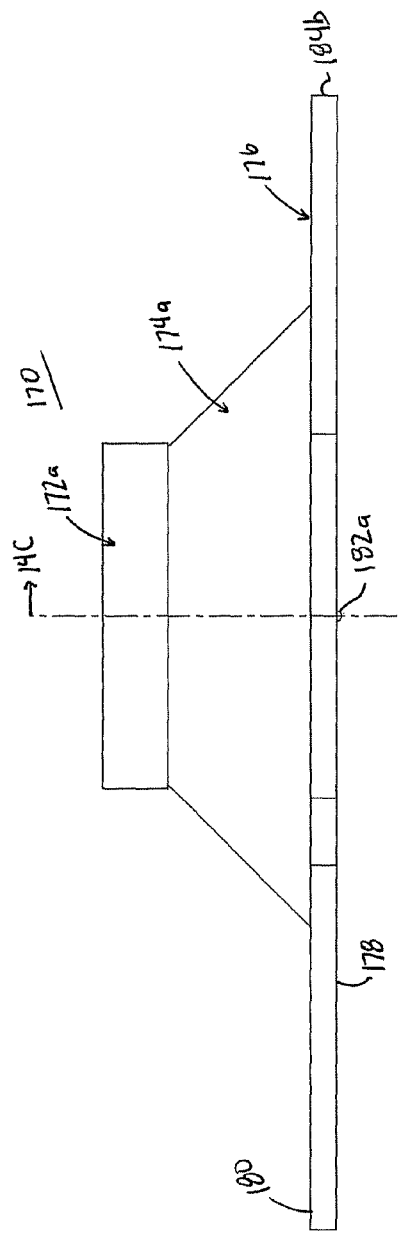
FIG. 14B is a side view of the button assembly of FIG. 14A.
FIG. 14C is a cross-sectional view of the button assembly of FIG. 14B, taken along the line 14C-14C.
Figure 14:
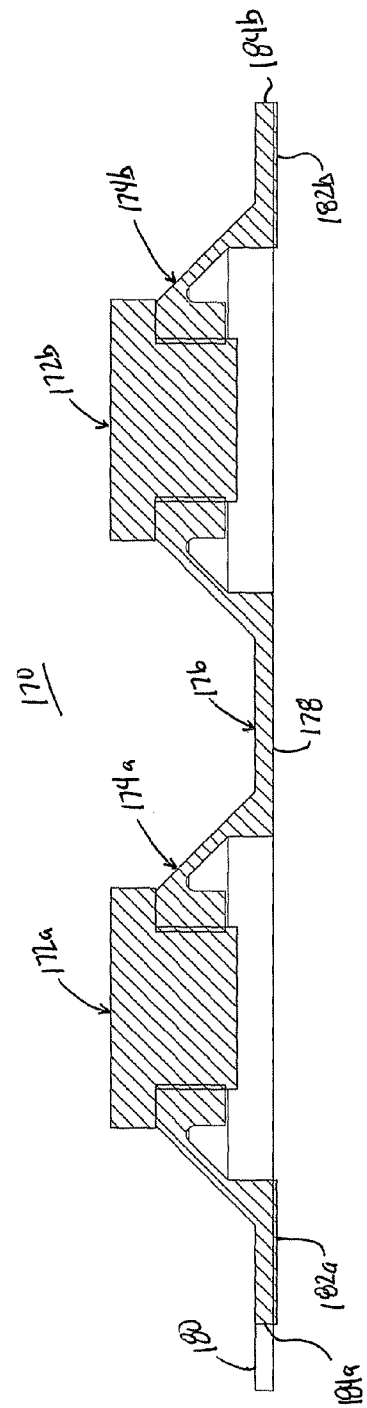

Another alternative button assembly 170 in accordance with principles of the present disclosure and akin to the button assembly 100 (FIGS. 4-6) is shown in FIGS. 14A-14C. The button assembly 170 includes first and second buttons 172a, 172b, first and second frames 174a, 174b, and a base 176. The button bodies 172a, 172b can be identical to the button body 102 (FIG. 4) described above. Alternatively, the button bodies 172a, 172b can incorporate a capacitive element and a conductive body akin to the button body 150 of FIGS. 11-13. The frames 174a, 174b can be identical to the frame 104 (FIG. 4) described above. As with previous embodiments, the button bodies 172a, 172b and the frames 174a, 174b have a complimentary configuration such that a respective one of the button bodies 172a, 172b is retained by a corresponding one of the frames 174a, 174b. Further, the base 176 is akin to the base 106 (FIG. 4) described above, and defines a mounting face 178. In general terms, then, the button assembly 170 of FIGS. 14A-14C differs in some respects from the button assembly 100 by incorporating two of the button bodies 172a, 172b, with the base 176 locating the frames 174a, 174b, and thus the button bodies 172a, 172b at spatial positions relative to one another that corresponding with the spatial relationship commonly provided between two virtual buttons on a touch screen (not shown).

In addition, FIGS. 14A-14C illustrate the base 176 has including an optional lift tab 180 and optional ribs 182a, 182b. The tab 180 extends from a perimeter shape 184 of the base 176, and provides a convenient grasping surface for a user when attempting to lift the button assembly 170 from a touch screen (or other surface). The ribs 182a, 182b project downwardly (relative to the orientation of FIGS. 14A-14C) from the mounting face 178, extending from a respective side 184a, 184b of the base 176 to a region of the corresponding frame 174a, 174b. The ribs 182a, 182b are, in some constructions, aligned with one another, intersecting a centerline of the frames 174a, 174b. While two of the ribs 182a, 182b are shown, in other embodiments, a single rib, or three or more ribs can be included. Regardless, the ribs 182a, 182b effectuate formation of a small air escape gap between the mounting face 178 and the touch screen (not shown) during use; under circumstances where the mounting face 178 overtly sticks to the touch screen (e.g., where the mounting face 178 is a highly polished silicone rubber), the air escape gap allows a user to more easily remove the button assembly 170 from the touch screen when desired. One or both of the lift tab 180 and the rib(s) 182a, 182b can be incorporated into any of the button assemblies of the present disclosure. In other constructions, one or both of the lift tab 180 and the rib(s) 182a, 182b can be omitted.

Figure 15:
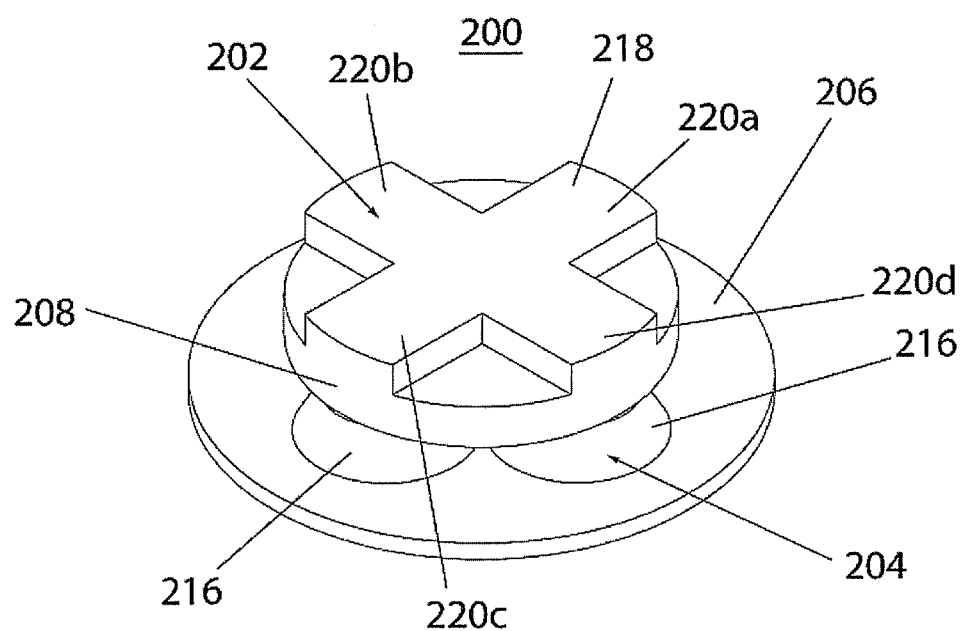
FIG. 15 is a perspective view of another button assembly in accordance with principles of the present disclosure.
Figure 16:
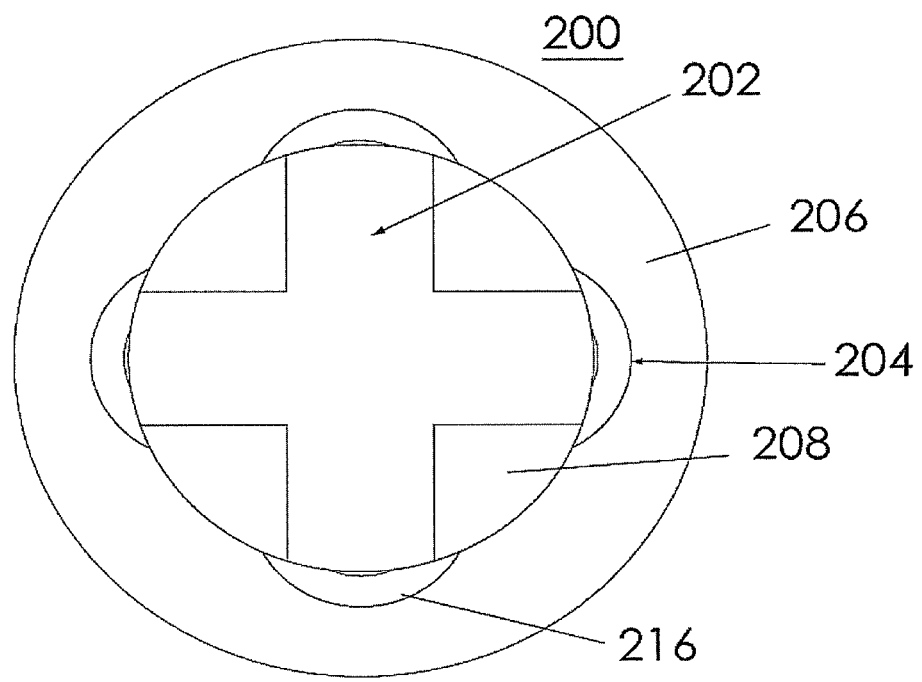
FIG. 16 is a top view of the button assembly of FIG. 15.
Figure 17:
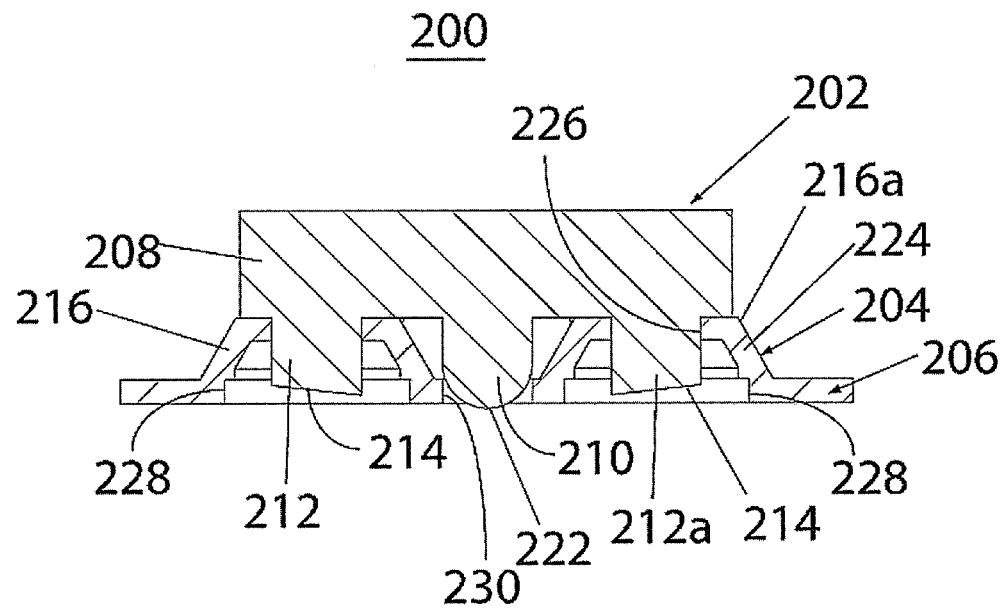
FIG. 17 is a cross-sectional view of the button assembly of FIG. 15.

While the button assemblies have been described as providing a single contact face and/or axial movement relative to the touch screen, a wide variety of other constructions are envisioned. For example, FIGS. 15-17 illustrate another embodiment button assembly 200 in accordance with principles of the present disclosure. The button assembly 200 is akin to previous embodiments, and includes a button body 202, a frame 204, and a base 206. The button body 202 includes a head 208, a post 210, and a plurality of feet 212 each terminating in a contact face 214. The frame 204 includes or forms a plurality of frame segments 216 each configured to receive respective ones of the feet 212. As described below, the frame segments 216 serves to guide the feet 212 during user manipulation of the button assembly 200.

The button assembly 200 is highly useful with touch sensor-related applications involving games, but is also useful with any application requiring an input of several points in close proximity to one another. In many games, the main method of user controller interface is via what is known as a "directional pad". The directional pad has a plurality of poles or directions that can be pressed to input a "direction" to the game. As the name implies, this "directional pad" often controls the direction of something in the game. With this in mind, and as best shown in FIG. 15, the head 208 can form or define a direction-indicating shape 218 (referenced generally). The direction-indicating shape 218 can have the "+" shape as shown and/or can include other directional-type indicia. With the one configuration of FIG. 15, however, four directional indicators 220a-220d are provided, with each of the directional indicators 220a-220b being aligned with a respective one of the feet 212.

The post 210 projects from the head 208, and terminates in a curved face 222. As described in greater detail below, the curved face 222 serves as a pivot point or fulcrum in facilitating user manipulation of the button body 202. Thus, the post 210 serves as a central axis of the button body 202.

The feet 212 are radially offset from the post 210, and in some embodiments are equidistantly spaced from one another relative to a circumference (or other shape) of a perimeter of the head 208. As best shown in FIG. 17, the feet 212 can be identical and have a length that is less than that of the post 210. In other words, relative to the orientation of FIG. 17, the curved face 222 of the post 210 is "below" the contact face 214 of each of the feet 212. Further, the contact faces 214 each define a tapered angle in a direction away from the post 210.

In some constructions, the button body 202, including the head 208, the post 210, and the feet 212, is an integrally formed, homogenous structure, and can be formed of an electrically conductive material. Alternatively, one or more embedded capacitive elements and conductive bodies (not shown), but akin to the capacitive element 160 and the conductive body 162 described above, can be employed.

The frame 204 is, in many respects highly similar to the frame 154 (FIG. 11) described above, with each of the frame segments 216 including or providing a deflectable annular shoulder 224. A relationship between individual ones of the feet 212 and the frame segments 216 is identified in FIG. 17 relative to a first foot 212a and a first frame segment 216a. The frame segment 216a forms an aperture 226 through which the foot 212a is received and retained. As a point of reference, the foot 212a and the frame segment 216a are axially aligned with the first directional indicator 220a otherwise illustrated in FIG. 15. When a pressing force is applied over the first foot 212a, the shoulder 224 of the first frame segment 216a will deflect from the normal state of FIG. 17, permitting the first foot 212a to move downwardly (and optionally generate the audible and/or tactile "click" as described above).

The base 206 can be akin to the base 106 (FIG. 4) described above. In this regard, the base 206 forms peripheral passages 228, respective ones of which are aligned with respective ones of the frame segments 216. Further, a central passage 230 is formed and through which the curved face 222 of the post 210 projects.

Though not shown, the button assembly 200 can further include any of the touch screen mounting structures described above.

Figure 18:
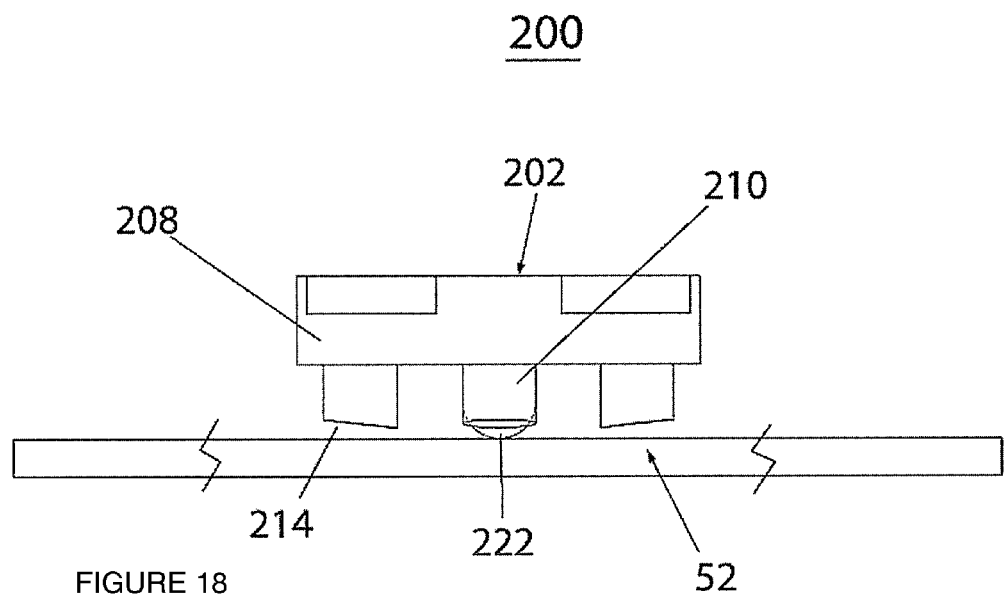
FIGS. 18 and 19 are side views illustrating use of the button assembly of FIG. 15 relative to a touch sensitive display screen.
Figure 19:
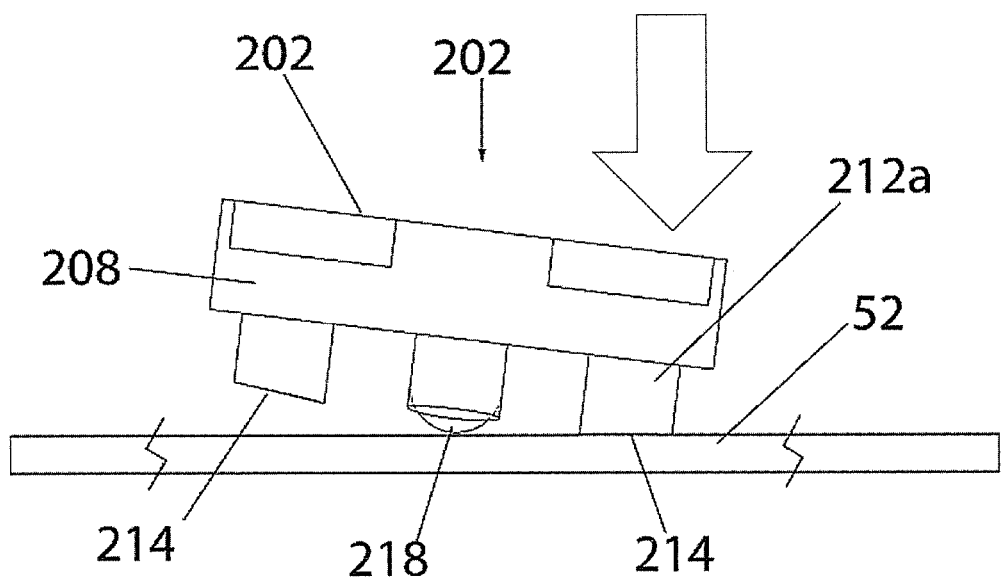

During use, the button assembly 200 can be mounted to a touch screen in any of the manners described above, and conventionally is located over a virtual "directional pad". FIGS. 18 and 19 illustrate use of the button assembly 200 relative to the touch screen 52, with the frame 204 (FIG. 15) removed for ease of explanation. As shown, the curved face 222 of the post 210 is in contact with the touch screen 52, and serves as a fulcrum or pivot point. In the natural state of FIG. 18, the contact face 214 of each of the feet 212 is displaced from the touch screen 52, and thus not making contact with the touch screen 52. In response to a user-applied force (shown by an arrow in FIG. 19), the button body pivots at the curved face 222, causing the contact face 214 of one of the feet (identified in FIG. 19 as the foot 212a) to contact the touch screen 52 in a manner by which the touch-receiving sensor(s) (not shown) will register as a user-intended touch at the corresponding, designated touch coordinates. The taper angle of the contact face 214 provides an enlarged surface area of interface with the touch screen 52 with pivoting of the button body 202 at the curved face 222. The frame segment 214 (not shown) associated with the foot 212a optionally generates an audible and/or tactile "click" and/or the "click" can be generated when the contact face 214 contacts the touch screen 52. Once the pressing force is removed, the button assembly 200 self-reverts back to the upright or normal state of FIG. 18, for example, due to the resiliency of the frame 204 (FIG. 15). Effectively, then, the post 210 serves to prevent all of the contact faces 214 from making contact with the touch display 52 at the same time.

Another embodiment button assembly 250 akin to the button assembly 200 is shown in FIGS. 20-24 in accordance with principles of the present disclosure and includes a button body 252, a frame 254, and a base 256. In general terms, the frame 254 retains the button body 252 in a manner permitting 360° of touch responsiveness.

Figure 20:
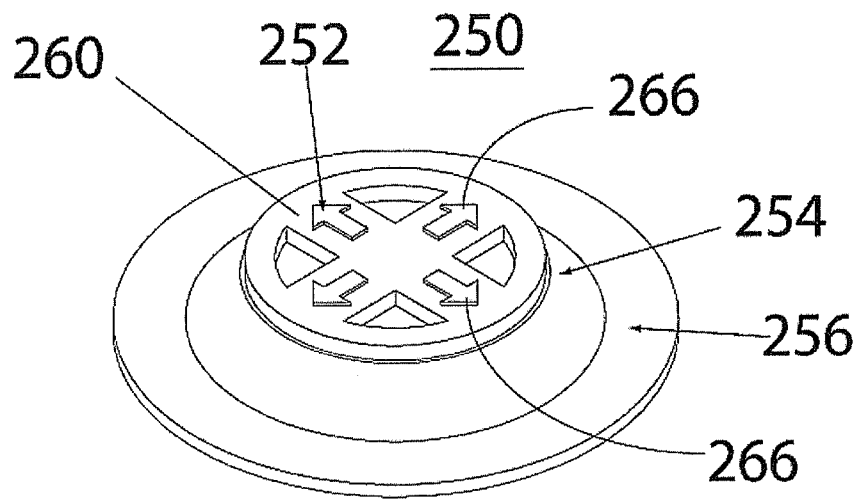
FIG. 20 is a perspective view of another embodiment button assembly in accordance with principles of the present disclosure.
Figure 21:
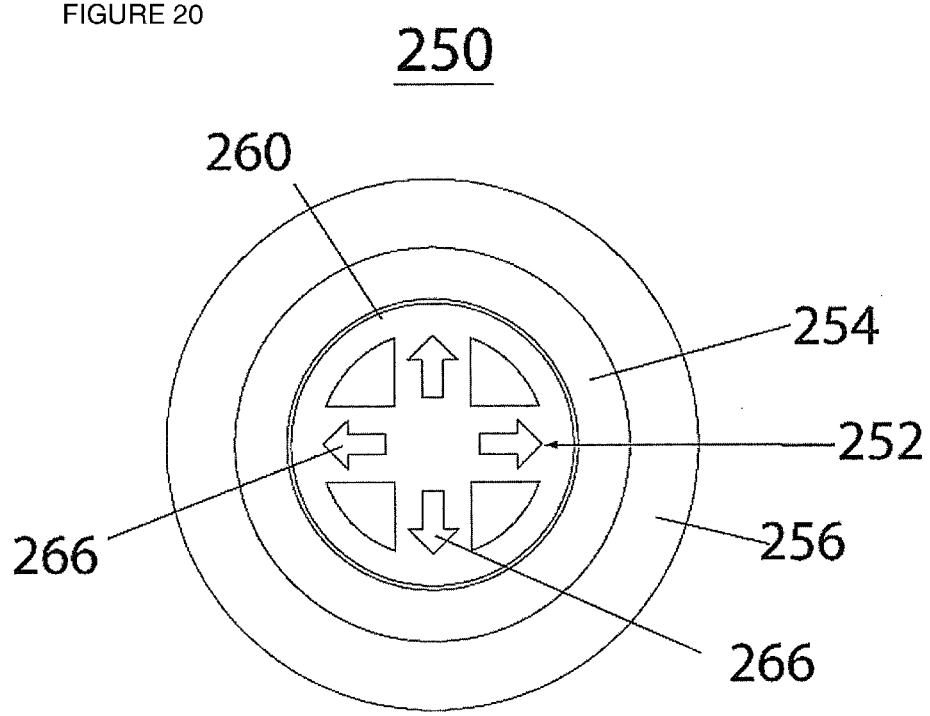
FIG. 21 is a top view of the button assembly of FIG. 20.
Figure 22:
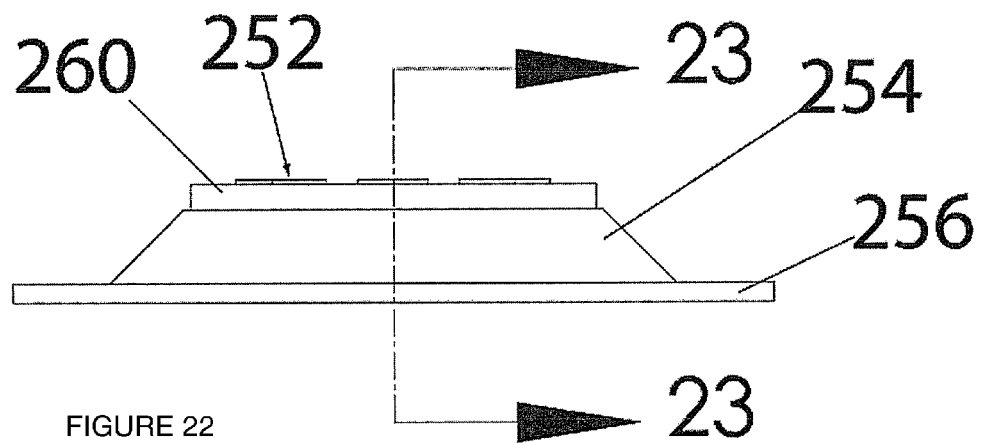
FIG. 22 is a side view of the button assembly of FIG. 20.
Figure 23:
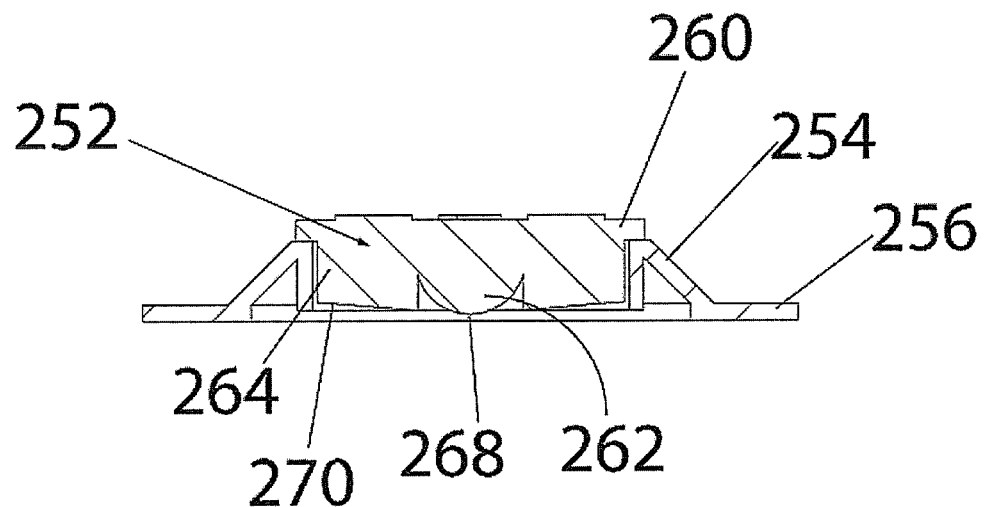
FIG. 23 is a cross-sectional view of the button assembly of FIG. 22, taken along the line 23-23.
Figure 24:
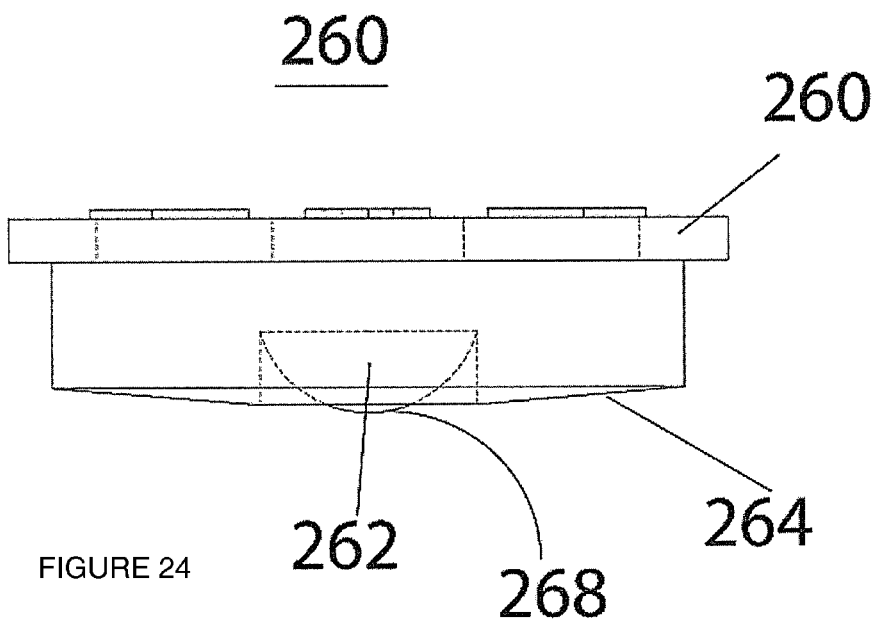
FIG. 24 is a side view of a button body portion of the button assembly of FIG. 20.

The button body 252 includes or defines a head 260, a post 262, and a ring 264. The head 260 can include or form direction-indicating features 266 as best shown in FIGS. 20 and 21. In some constructions, the head 260 has a circular perimeter. The post 262 is centrally positioned relative to a shape of the head 260, and extends to and defines a curved face 268. As described below, the curved face 268 serves as a pivot point or fulcrum during user manipulation of the button assembly 250. Finally, the ring 264 projects from the head 260, and circumferentially surrounds the post 262. In this regard, the ring 264 terminates at a contact face 270. Relative to the orientation of FIG. 23, the contact face 270 is "above" the curved face 268 of the post 262.

In some constructions, the button body 252, including the head 260, the post 262, and the ring 264, is an integrally formed, homogenous structure, and can be formed of an electrically conductive material. Alternatively, any of the embedded capacitor/conductive body constructions described above can be employed.

The frame 254 is akin to the frame 104 (FIG. 4) described above. In general terms, then, the frame 254 is deflectable from the normal or natural state of FIGS. 20-23 to a depressed state in response to a user-applied force to the button body 252. In this regard, the frame 254 can facilitate generation of an audible and/or tactile "click" as described above. The base 256 can be identical to the base 106 (FIG. 4) described above. Finally, the button assembly 250 can incorporate any of the touch screen mounting structures previously mentioned.

Figure 25:
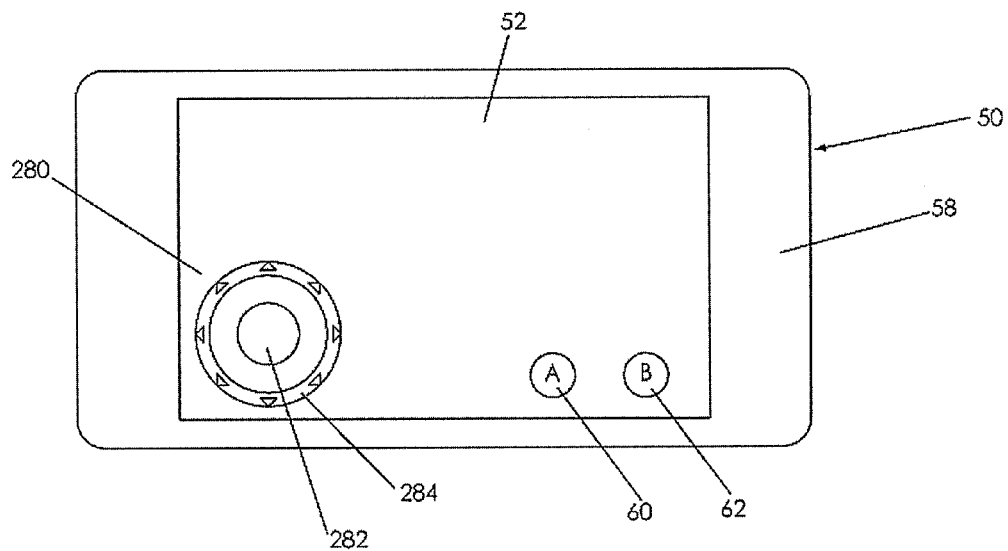
FIGS. 25 and 26 are simplified, top plan views of a virtual controller displayed on a touch sensitive display screen.
Figure 26:
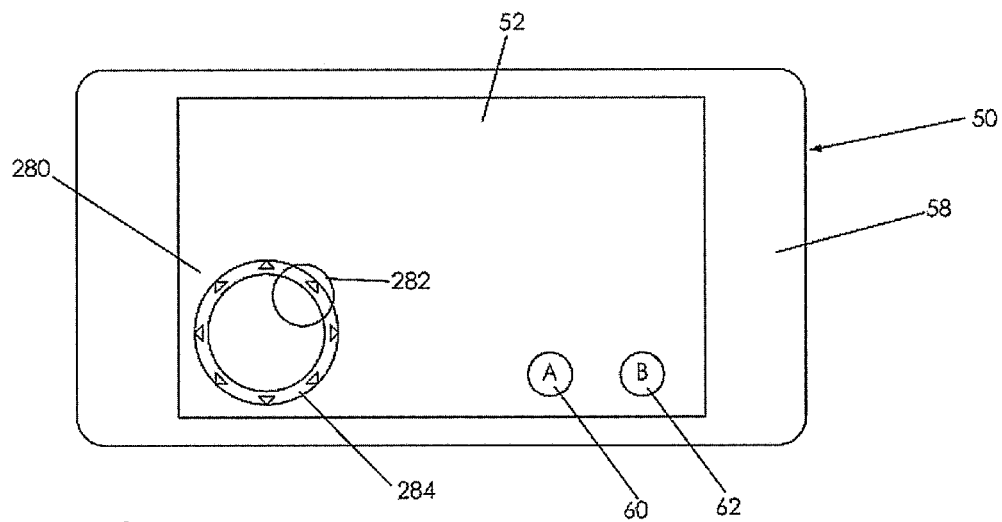

The button assembly 250 does not necessarily provide touch-registering contact at discrete positions, but instead is uniquely configured to make contact at an infinite number of positions around a center pivot point generated by the post 262. The button assembly 250 is highly useful to input an angle to the touch-sensing device in question. In some cases, this controls the direction of a character or object in a video game. For example, FIGS. 25 and 26 show one arrangement of a "virtual controller" or directional pad 280 that is "rotationally analog" meaning that the virtual controller 280 can be used to input any angle between 0-360°. This is often used to denote the direction of something in the game or application. In FIG. 25, the virtual controller 280 otherwise displayed on the touch screen 52 can include a directional indictor 282 situated inside a ring 284. During intended operation, the directional indicator 282 can be dragged at various angles around its center point as shown in FIG. 26. If the touch screen 52 is touched at various points around the ring 284, the directional indicator 282 may appear below the user's finger. The virtual controller 280 is used to express the angle made by the user's finger relative to the center point of the ring 284. In some instances, it can also input the distance from the touch to the center of the ring 284, which is often interpreted as magnitude. As a point of reference, FIG. 26 illustrates movement of the directional indicator 282 toward the upper right of the ring 284.

Figure 27:
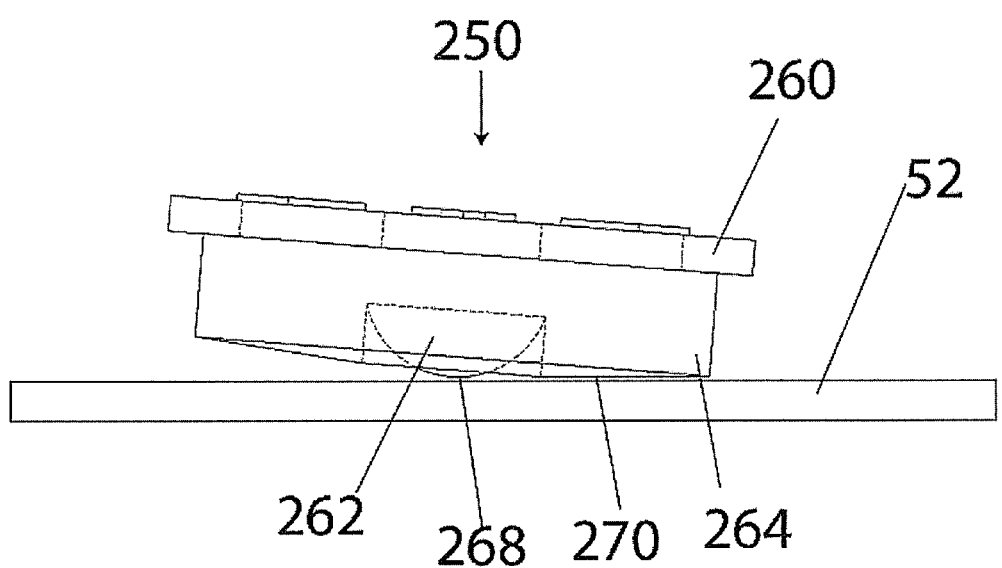
FIG. 27 is a side view illustrating use of the button assembly of FIG. 20 relative to a touch sensitive display screen.

With the above understanding of one conventional virtual controller 280 in mind, use of the button assembly 250 relative to the touch screen 52 is provided in FIG. 27 (with the frame 254 and the base 256 removed for ease of explanation). As shown, when a user-applied pressing force is generated along a perimeter of the head 260 (to the right in FIG. 27), the button body 252 will pivot at the curved face 268 of the post 262. This motion, in turn, brings the contact face 270 of the ring 264 into contact with the touch screen 52 at a location directly below (or aligned with) the point or location at which the force is applied to the head 260. The touch-receiving sensor(s) (not shown) associated with the touch screen 52 thus registers a user-intended touch at the corresponding designated touch coordinates. Upon removal of the user-applied force, the button assembly 250 self-reverts back to the natural, upright state in which an entirety of the contact face 264 is displaced from (or otherwise not in contact with), the touch screen 52. Further, if the user-applied force is moved along a perimeter of the head 260, the button body 252 pivots or rotates about the curved surface 268, with the zone of touch-registering interface between the contact face 264 and the touch screen 52 "moving" in a corresponding manner. In other words, the touch-registering interface "rotates" about the center point with "rotating" or scrolling movement of the user's finger along the head 260.

Figure 28:
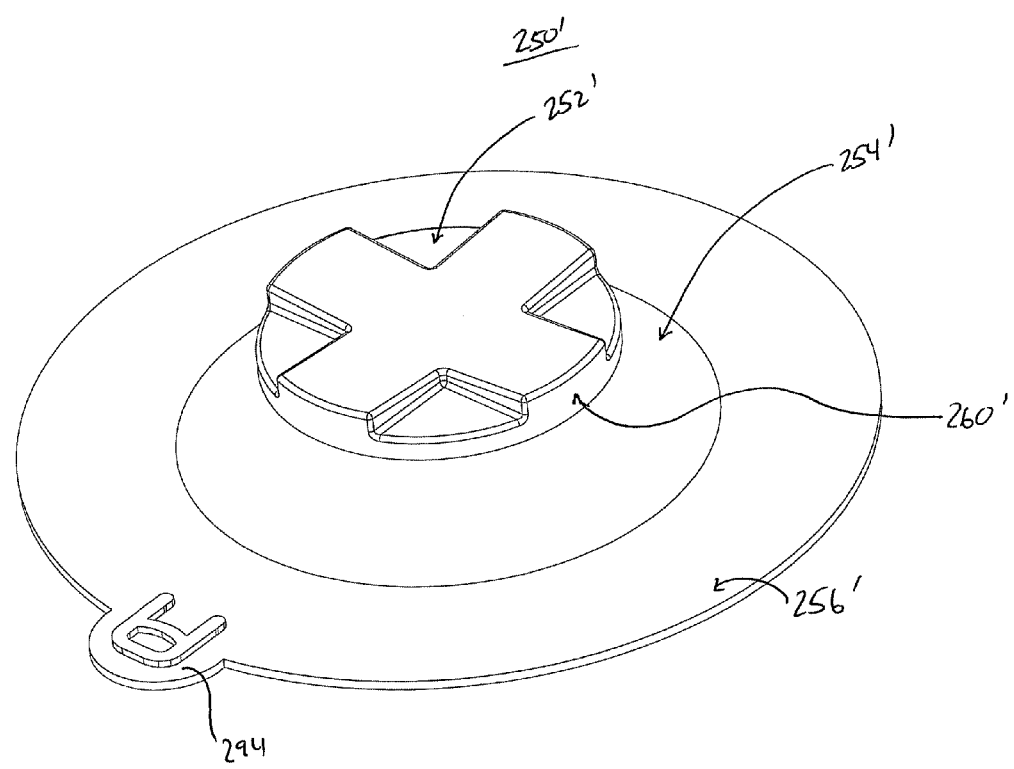
FIG. 28A is a perspective view of another button assembly in accordance with principles of the present disclosure.
FIG. 28B is a side view of the button assembly of FIG. 28A.
FIG. 28C is a cross-sectional view of the button assembly of FIG. 28B, along the line 28C-28C.
Figure 28:
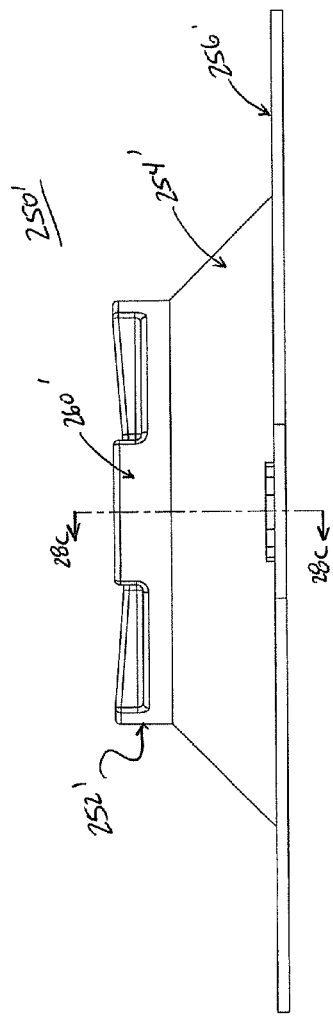
Figure 28:
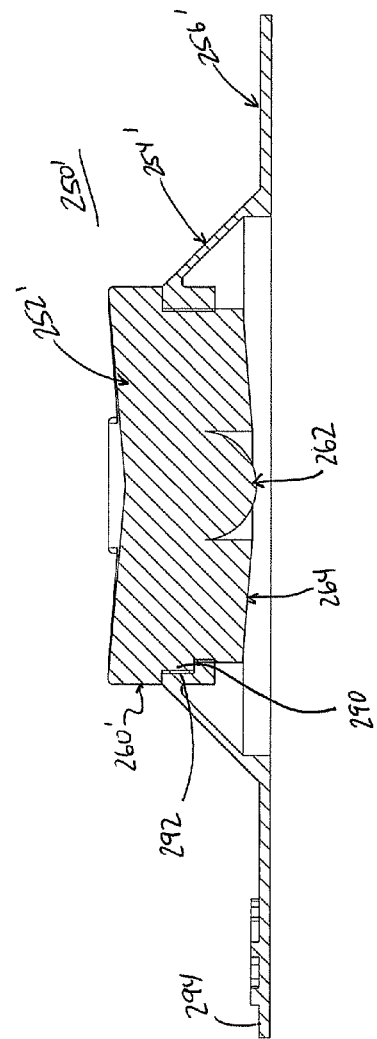

Another embodiment button assembly 250' in accordance with principles of the present disclosure is shown in FIGS. 28A-28C, and is in many respects identical to the button assembly 250 described above. The button assembly 250' includes a button body 252', a frame 254', and a base 256'. The button body 252' can be identical to the button body 252 (FIG. 20), and includes a head 260', the post 262 and the ring 264. While the head 260' can be identical to the head 260 (FIG. 20) described above, with the construction of FIGS. 28A-28C, the head 260' forms one or more keying structures 290 (one of which is illustrated in FIG. 28C). The keying structure 290 protrudes radially from a perimeter of the head 260', and is sized to be received within a corresponding slot 292 defined by the frame 254'. Assembly of the button body 252' to the frame 254' includes inserting the keying structure(s) 290 within a corresponding slot 292, with a frictional interface between the keying structure 290 and the slot 292 promoting robust engagement there between. Other mounting configurations are also acceptable. The base 256' can generally be identical to the base 256 (FIG. 20) previously described, and further includes an optional lift tab 294.

Figure 29:
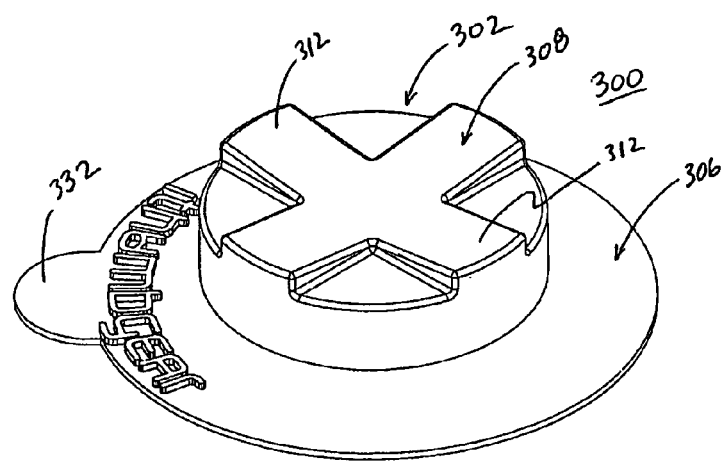
FIG. 29A is a perspective view of another button assembly in accordance with principles of the present disclosure.
FIG. 29B is an exploded side view of the button assembly of FIG. 29A.
Figure 29:
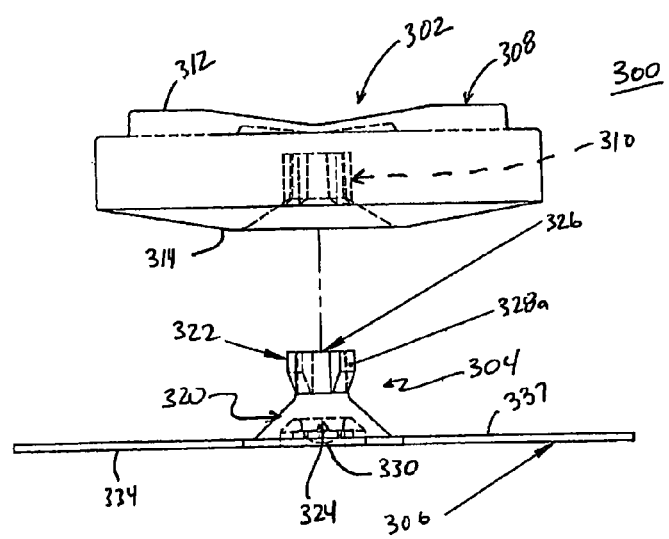

Another embodiment button assembly 300 is shown in FIGS. 29A and 29B, and includes a button body 302, a frame 304, and a base 306. In general terms, the button assembly 300 is akin to the button assembly 250 (FIG. 20), with the frame 304 retaining the button body 302 in a manner permitting 360° of touch responsiveness.

The button body 302 can be constructed of any of the materials described above, and can have the generally circular perimeter shape as shown. Regardless, the button body 302 forms a user face 308 and a mounting bore 310. The user face 308 can be formatted for convenient interface there with by a user's finger(s) or thumb, and thus can define a plurality of raised shoulders 312 having an inwardly tapering height to collectively define a concave-like shape. Other formats are also acceptable.

Figure 30:
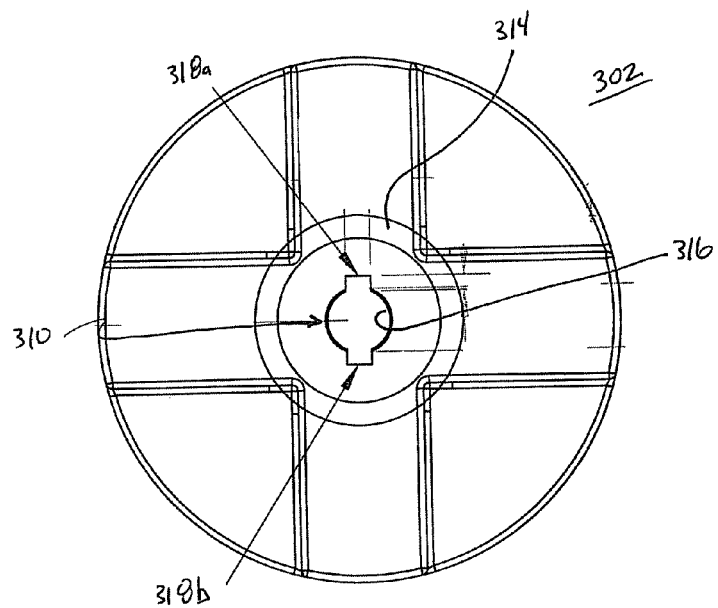
FIG. 30 is a bottom plan view of a button body portion of the button assembly of FIG. 29A.

The bore 310 is open at a lower contact face 314 of the button body 302, and is generally configured to facilitate assembly of the button body 302 with a corresponding features of the frame 304. For example, and as best shown in FIG. 30, in one embodiment the bore 310 includes a central aperture 316 and slots 318a, 318b. The central aperture 316 extends longitudinally from the lower face 314. The slots 318a, 318b are located at opposite sides of, and are open relative to, the central aperture 316. A width of the slots 318a, 318b is less than a diameter (or other width-related dimension) of the central aperture 316.

Returning to FIG. 29B, the contact face 314 defines a slight upward angle in radial extension from bore 310. As described below, during use of the button assembly 300 in which the button body 302 is manipulated in a pivoting fashion relative to the base 306, segments of the button body 302 will be brought into contact with the base 306 to effectuate a touch registering event. By incorporating the upward taper along the contact face 314, a sufficiently large surface area of the button body 302 will contact the base 306 when the pivoted. Alternatively, the contact face 314 can have other shapes or features.

The frame 304 includes an annular shoulder 320, a head 322, and a post 324. The annular shoulder 320 can assume any of the forms previously described, and maintains the head 322 and the post 324 at a desired elevation relative to the base 306. As with previous embodiments, the annular shoulder 320 is resiliently deflectable, and can be deflected from the normal or natural state of FIGS. 29A and 29B to a depressed state in response to a user-applied force to the button body 302. Further, a flexibility of the annular shoulder 320 permits the head 322 and the post 324 (and thus the button body 302 otherwise attached to the head 322) to pivot relative to the base 306 in response to user manipulations of the button body 302.

Figure 31:
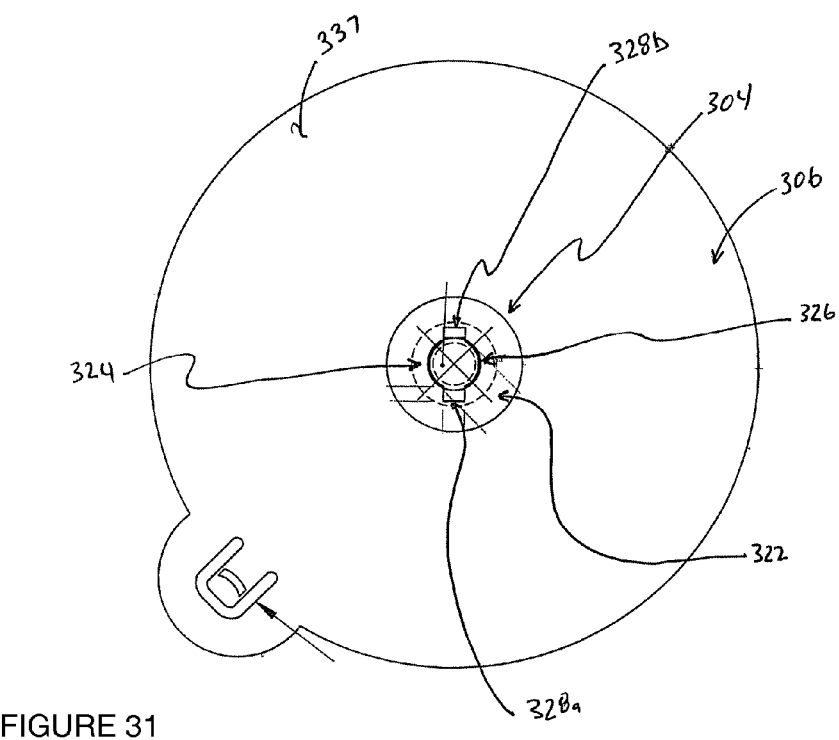
FIG. 31 is a top plan view of frame and base portions of the button assembly of FIG. 29A.

The head 322 is configured to facilitate mounting of the button body 302, and thus can incorporate complimentary mounting features. For example, with the one embodiment in which the button body 302 includes the bore 310 as described above, the head 322 includes a central pin 326 and keying structures 328a, 328b as best shown in FIG. 31. With cross-reference between FIGS. 30 and 31, the central pin 326 extends from the annular shoulder 320 in a direction opposite the base 306, and defines a diameter commensurate with a diameter of the central aperture 316. The keying structures 328a, 328b project radially from opposite sides of the central pin 326, and are sized and shaped in accordance with the slots 318a, 318b. With this construction, assembly of the button body 302 to the head 322 includes inserting the pin 326 into the central aperture 316. In this regard, the keying structures 328a, 328b are inserted into, and rotationally captured by, a corresponding one of the slots 318a, 318b. Upon final mounting, then, the button body 302 is rotationally locked relative to the frame 304, with a frictional interface between the head 322 and the bore 310 effectuating relatively fixed engagement. An adhesive can optionally be employed to provide further fixation between the button body 302 and the head 322.

Returning to FIG. 29B, the post 324 projects from the annular shoulder 320 in a direction opposite the head 322, and terminates at a stop face 330. The stop face 330 is, in some embodiments, curved (e.g., uniform convex curvature). Regardless, an exterior of the post 324 is spaced from an interior of the annular shoulder 320 (best seen in FIG. 32) such that the post 324 can pivot relative to the annular shoulder 320. In some embodiments and end uses, the area of interface between the annular shoulder 320 and the post 324 effective serves as a pivot point or fulcrum during user manipulation of the button assembly 300. Alternatively or in addition, the stop face 330 serves as the pivot point, for example when the stop face 330 is disposed against a flat surface (such as a touch screen) and a rocking force is applied by a user at the head 320 (via the button body 302).

Figure 32:
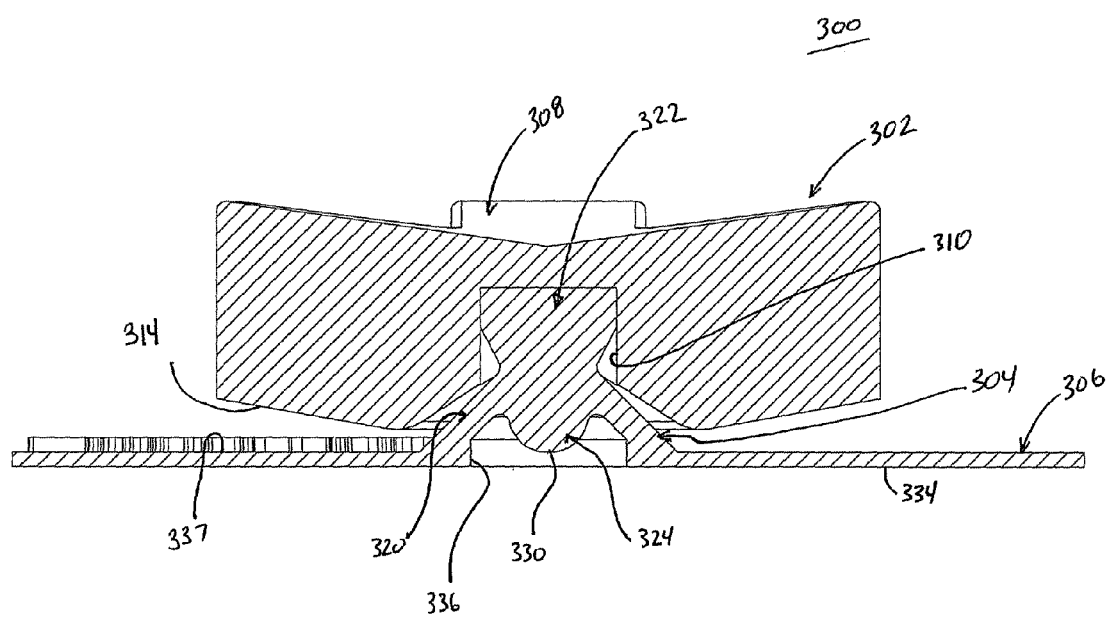
FIG. 32 is a cross-sectional view of the button assembly of FIG. 29A.

The base 306 can assume any of the forms previously described, and optionally includes or forms a lift tab 332 as shown in FIG. 29A. As with previous embodiments, the base 306 can be integrally formed with the frame 304 (e.g., a molded, highly polished silicone body), and defines a mounting face 334 and a central passage 336 as best illustrated in FIG. 32. A button face 337 is defined opposite the mounting face 334. The central passage 336 is aligned with the post 324, such that the stop face 330 can project through the passage 336 (in response to a user-applied force to the button body 302).

Upon final assembly, the normal arrangement of the annular shoulder 320 locates the stop face 330 slightly above the mounting face 334. Further, the contact face 314 of the button body 302 is spaced above the button face 337 of the base 306. The button assembly 300 does not necessarily provide touch-registering contact at discrete positions, but instead is configured to effectuate touch-registering events at an infinite number of positions around a center pivot point generated by the post 324 in a manner akin to the descriptions provided above with respect to the rotationally analog-type virtual controller 280 (FIGS. 25 and 26). In response to a user-applied force upon a perimeter of the button body 302, the button body 302 will pivot relative to the base 306 via pivoting of the head 322/post 324 and deflection of the annular shoulder 320. This motion, in turn, brings a segment of the contact face 314 of the button body 302 into contact with the button face 337 of the base 306. This segmented contact, in turn, is transferred through a thickness of the material of the base 306 and registered at the touch screen (not shown) at a location directly below (or aligned with) the point or location at which the force is applied to the button body 302. The touch-receiving sensor(s) (not shown) associated with the touch screen thus register a user-intended touch at the corresponding designated touch coordinates. Upon removal of the user-applied force, the button assembly 300 self-reverts back to the normal, upright state in which an entirety of the contact face 314 is displace from, or otherwise not in contact with, the base 306. Further, if the user-applied force is moved along a perimeter of the button body user face 308, the button body 302 pivots or "rotates" along or relative to the button face 337 (via pivoting of the head 322/post 324 relative to the annular shoulder 320), with the zone of touch-registering interface between the contact face 314 and the button face 337, and thus between the base 306 and the touch screen, "moving" in a corresponding manner. In other words, the touch-registering interface "rotates" about the center point with "rotating" or scrolling movement of the user's finger along the button body user face 308.

In related embodiments, the user can apply sufficient downward force onto the button body 302 to cause the stop face 330 to come into contact with the touch screen. Under these circumstances, pivoting or rolling-type movements of the button body 302 (in response to user manipulations thereof) are effectively centered at the region of contact between the stop face 330 and the touch screen. By providing a small gap between the stop face 330 and the mounting face 334 of the base 306 in the normal state of the button assembly 300, the distance of travel necessary to bring the stop face 330 into contact with the touch screen corresponds with deflection of the annular shoulder 320 sufficient to produce the audible "click" described above and provide desired tactile feedback to the user.

Though not shown, the button assembly 300 can further include any of the touch screen mounting structures described above.

Figure 33:
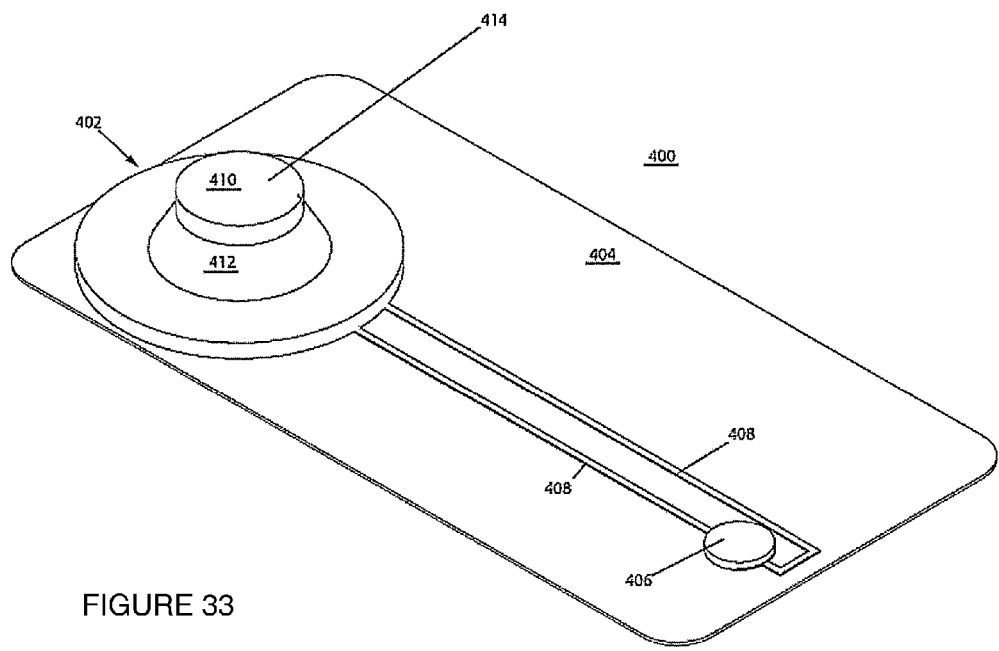
FIG. 33 is a perspective view of a button assembly system in accordance with principles of the present disclosure.
Figure 34:
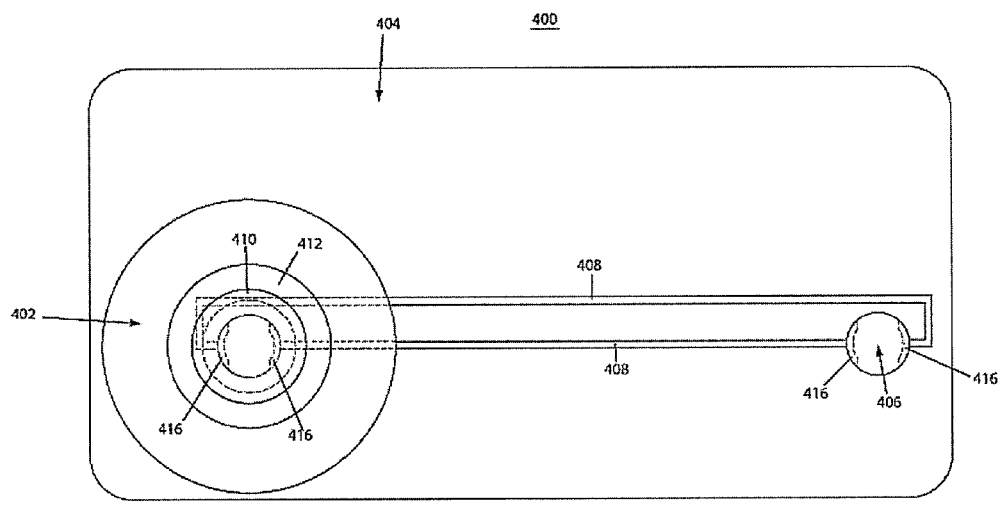
FIG. 34 is a top view of the system of FIG. 33.
Figure 35:
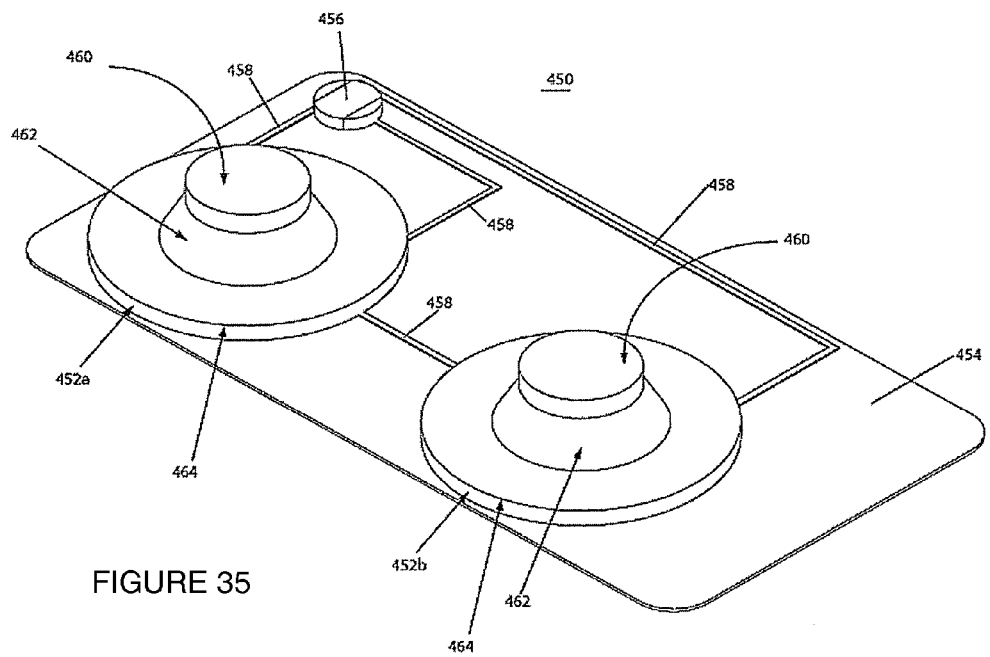
FIG. 35 is a perspective view of another embodiment button assembly system in accordance with principles of the present disclosure.
Figure 36:
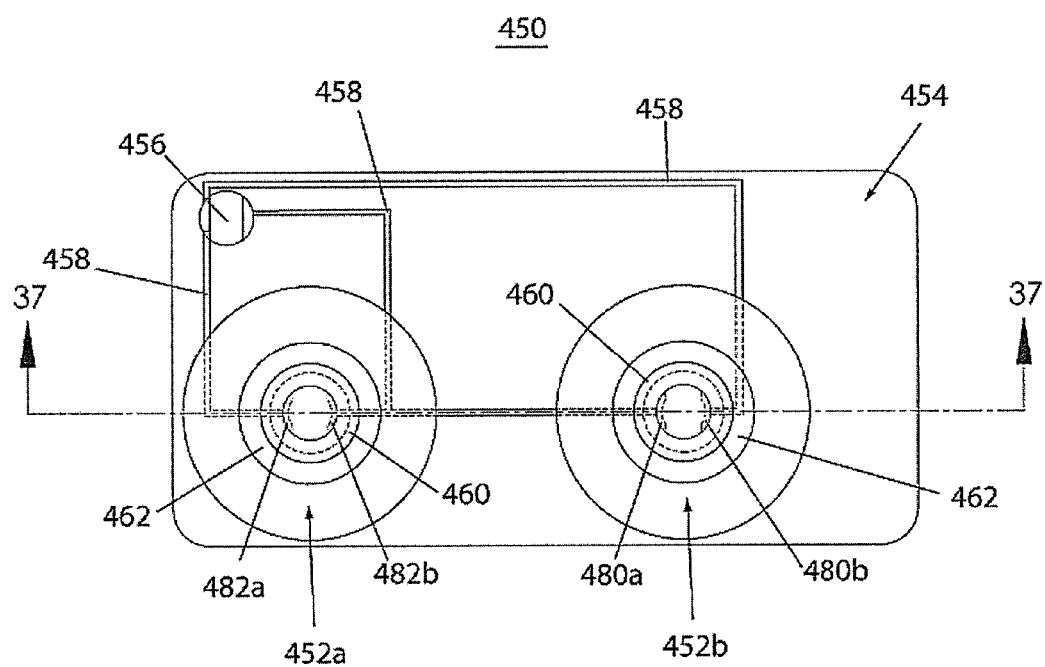
FIG. 36 is a top view of the system of FIG. 35.
Figure 37:
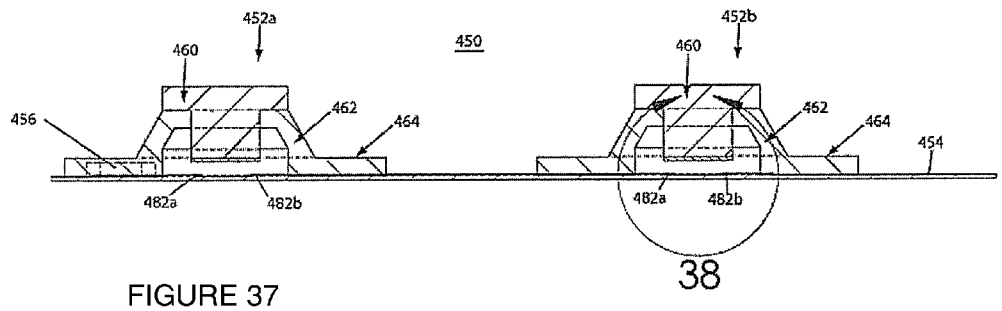
FIG. 37 is a cross-sectional view of the system of FIG. 36, taken along the line 37-37.

While various embodiments have been described as effectuating touch-type interface with designated touch coordinates directly beneath the corresponding contact face, in other embodiments, the button assembly can be discretely located (i.e., off-set from) the designated touch coordinates. For example, a button assembly system 400 in accordance with principles of the present disclosure is shown in FIGS. 33 and 34. The system 400 includes a button assembly 402, a substrate 404, a touch generating pad 406, and conductive traces 408. The button assembly 402 can assume any of the forms described above. The substrate 404 physically connects the button assembly 402 with the touch generating pad 406. The button assembly 402 is further selectively electrically connected to the contact pad 406 by the circuitry traces 408.

The button assembly 402 includes a button body 410 and a frame 412. The button body 410 can assume any of the forms described above, and generally include a head 414 and conductive elements 416. The button body 410 can be formed of an electrically conductive material, and thus a user's electrical properties can be transmitted from the head 414 to the conductive elements 416. Alternatively, the embedded capacitive element structures previously described can be employed. The frame 412 can be identical to the frame 104 (FIG. 4) described above, and thus can optionally be configured to facilitate generation of an audible and/or tactile "click" with forced transition from the normal or natural state of FIG. 33 to a depressed state as described above.

The touch generating pad 406 is configured to generate a charge sufficient to be registered as a touch by one or more touch-receiving sensors (not shown) associated with the touch screen to which the system 400 is applied. For example, the touch generating pad 406 can be formed of a conductive metal (e.g., copper, aluminum, gold, silver, etc.), conductive silicone rubber, carbon impregnated rubber, etc.

The conductive traces 408 can be formed of any electrically conductive material as conventional known (e.g., metal, conductive silicone rubber, carbon impregnated rubber, etc.).

During use, when pressed, the button body 410 provides electrical conductivity from a user's finger down to the conductive elements 416. The user's electrical properties are then transmitted through the conductive traces 408 to the touch generating pad 406. Thus, when overlaid upon a touch screen, a press on the head 414 will generate a touch registerable event at a location directly below the touch generating pad 406. Though not shown, the system 400 can further include any of the touch screen mounting structures described above.

Figure 1:
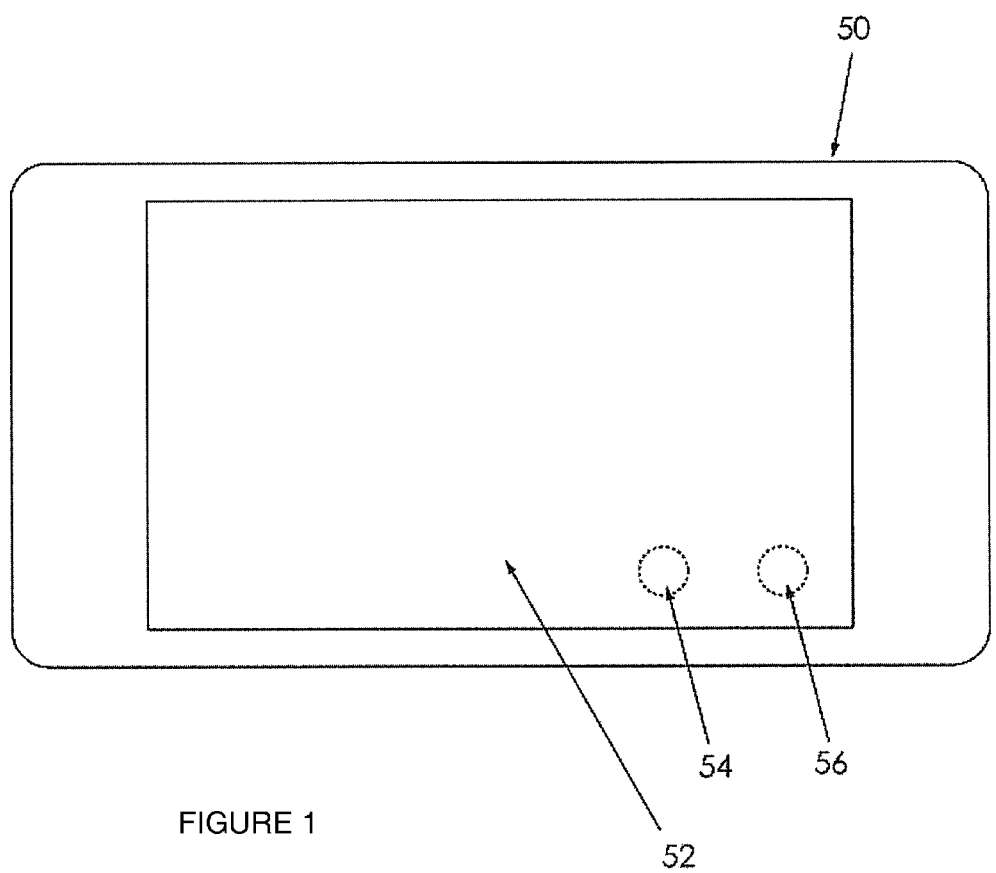
FIG. 1 is a simplified plan view of a hand-held device including a display screen and touch-receiving sensors.

Separating a location of the button assembly 402 from the touch generating pad 406 (and thus a location of a user-applied button press from the location of the generated touch event) creates several advantages. For example, where just the touch generating pad 406 portion of the system 400 is placed on top of a device with a touch screen (e.g., an iPhone), the system 400 has minimal effect on visual obstruction of the touch screen. By way of further example, in a typical hand-held device (such as the device 50 of FIG. 1), there is a section of the device that is outside of the touch screen 52. The system 400 can be oriented relative to the touch screen such that the button assembly 402 portion is located at this "outside area", and the touch generating pad 406 portion placed on the touch screen 52. This allows the user to keep his or her fingers outside of the touch screen 52, thus reducing possible visual obstruction of the touch screen.

Further, by separating the button assembly 402 (or additional button assemblies) from the touch generating pad(s) 406, the shape and alignment of each separate interface can be designed according to its desired advantages. For example, the user interface, or button assemblies, can be designed to be easy to press, and the portion of the system 400 that is otherwise overlaid onto the touch screen can be designed to be less visually intrusive. For example, the button assembly 402 can be shaped like a 4-point directional pad, while the touch generating pad(s) 406 could be shaped in a line.

With the above techniques, by keeping the button assembly 402 (or multiple button assemblies 402) "off" of the touch screen, the user can mount the system 400 to the display screen, but still will be able to use other functions (e.g., send email, take pictures, etc.).

The button assembly system 400 is not limited to incorporating a single button assembly 402. For example, two (or more) of the button assemblies 402 can be carried by the substrate 404. The button assemblies 402 can each be electrically connected to a discrete touch generating pad, or can be commonly connected to the single touch generating pad 406. In related embodiments, a button assembly system is provided that includes two (or more) of any of the button assemblies described above carried by a common substrate (e.g., akin to a keyboard), or differing button assemblies (e.g., one of the button assemblies 100 of FIG. 4 and one of the button assemblies 200 of FIG. 15). With these and other embodiments, the system may or may not incorporate the offset touch generating pad (e.g., the carrier substrate is sized to be laid directly over the virtual controller, with the various button assemblies naturally residing directly over the corresponding desired touch coordinates).

In yet other, related embodiments, the plurality of button assemblies carried by a substrate can be linked to a common capacitive element. FIGS. 35-38 illustrate another button assembly system 450 in accordance with principles of the present disclosure. The system 450 includes two (or more) button assemblies 452a, 452b, a substrate 454, a capacitive element 456, and conductive traces 458.

The button assemblies 452a, 452b can be identical, and can generally assume any of the formats described above. In general terms, each of the button assemblies 452a, 452b includes a button body 460, a frame 462, and a base 464. The first button assembly 452a is shown in greater detail in FIG. 38, it being understood that the second button assembly 452b can have an identical construction. As illustrated, the button body 460 includes a head 470 and a conductive element 472. The conductive element 472 is mounted to an underside of the head 470. With this construction, the head 470 need not be formed of an electrically conductive material. Alternatively, in other embodiments, the head 470 is electrically conductive such that the conductive element 472 can be omitted. The frame 462 can be identical to the frame 104 (FIG. 4) described above, and thus can be optionally be configured to facilitate generation of an audible and/or tactile "click" with forced transition from the normal or natural state of FIG. 38 to a depressed state as described above. Similarly, the base 464 can be identical to the base 106 (FIG. 4) described above.

Figure 38:
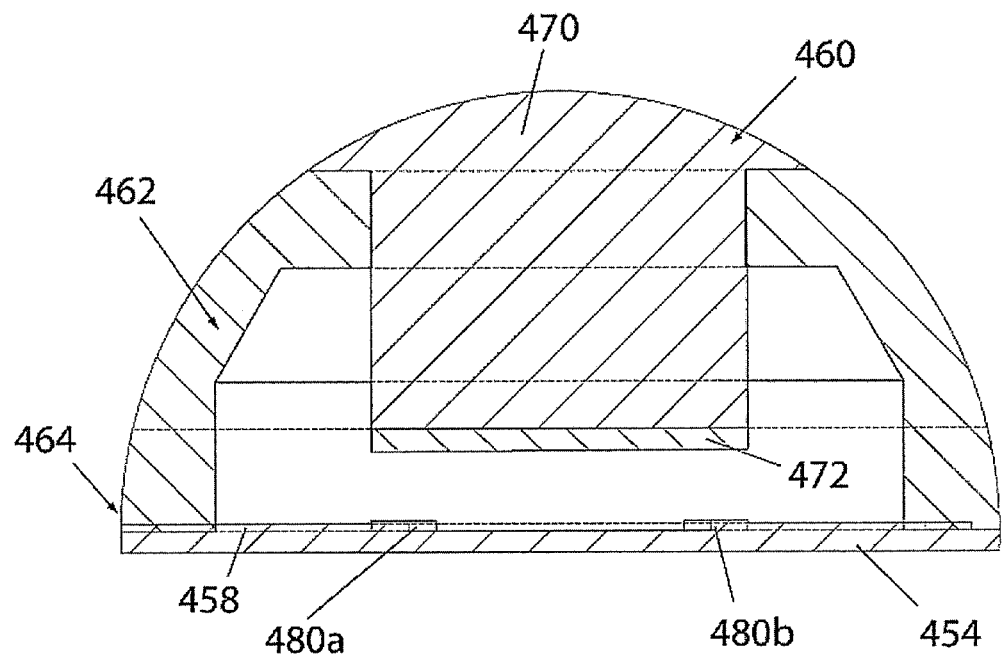
FIG. 38 is an enlarged view of a portion of a button assembly of the system of FIG. 37 along the line 38-38.

FIG. 38 further illustrates first and second contact elements 480a, 480b maintained by the substrate 454 immediately beneath the button body 460. The contact elements 480a, 480b are spaced from one another (and thus electrically isolated), and electrically connected to respective segments of the conductive traces 458. The conductive element 472 and the contact elements 480a, 480b are configured in accordance with one another, such that when the button body 460 is transitioned from the normal state of FIG. 38 to a depressed state (for example via deflection of the frame 462), the conductive element 472 intimately contacts the contact elements 480a, 480b to generate an electrical connection therebetween. To better ensure desired electrical interface, one or more of the conductive element 472 and the contact elements 480a, 480b can have separate ledges or tears. As referenced generally in FIG. 37, contact elements 482a, 482b are similarly provided with respect to the first button assembly 452a.

Returning to FIGS. 35 and 36 with the above construction of the assembly 400, the capacitive element 456 is commonly "shared" by the button assemblies 452a, 452b, and facilitates generating a touch-registerable action upon pressing of the corresponding button body 460. For example, with additional reference to FIG. 38, when the button body 460 is depressed, the conductive element 472 is brought into contact with the electrical contacts 480a, 480b. Electrical conductivity is thus established with the capacitive element 456 via the traces 458. As a result, a charge is generated at the conductive element 472 at a level sufficient to be recognized as a touch event directly below the button body 460. The first button assembly 452a functions in a similar manner. Notably, the conductive traces 450a do not, in and of themselves, register a touch event on the touch screen when the button assemblies 452a, 452b are in their normal state (i.e., not pressed). This can be due to the traces 458 being smaller than the minimum required, the substrate 454 having sufficient thickness, etc.

Figure 39:
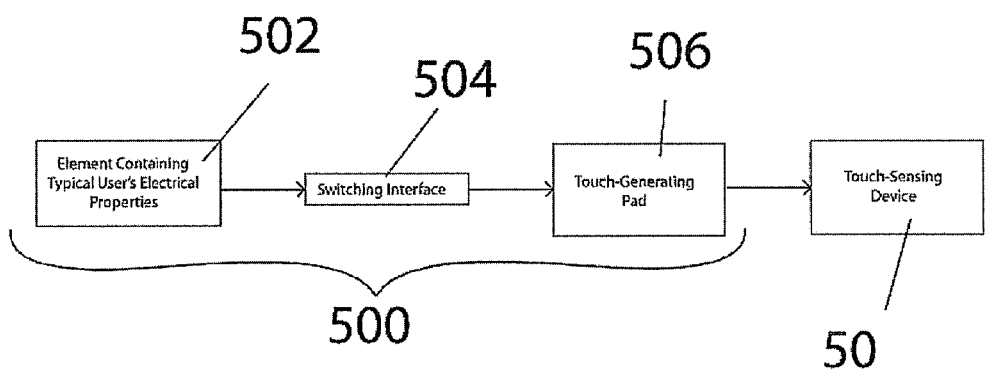
FIG. 39 is a block diagram of another button assembly system in accordance with principles of the present disclosure.

The assembly 450 is useful with touch sensing systems that employ electrical properties to sense a touch. These and other embodiments, can more generically be described with reference to FIG. 39. A button assembly system 500 including an element containing typical user's electrical properties 502, a switching interface 504, and a touch generating pad 506, is mounted to the touch sensing device 50. The element 502 can be embedded within a provided button assembly (as in FIG. 12) or can be separated from the button assembly (as in FIG. 35). Similarly, the touch generating pad 506 can be provided with the button assembly (as in FIGS. 6, 12, 17, 23, 38) or separate from the button assembly (as in FIG. 33). Regardless, a switching interface 504 (e.g., a transistor) controls whether or not the touch generating pad 506 is electrically charged, and thus whether or not a touch registerable action occurs. This may be advantageous when trying to minimize the area of the touch screen covered by the button assembly system. In one case, instead of having one touch sensitive area linked to one and only one button assembly, there can be multiple actions linked to the single touch sensitive area. This can be accomplished by interpreting or designating encoding a button press into multiple touch registering actions. For example, consider a button press as representing a 1, and a button not being pressed as representing a 0. This introduces a system that can interpret information longer than one bit. For example, a first button could be represented by the electronic code 1010, and a second button represented by the electronic code 1110. There are various details such as a start or stop bits, number of bits, clock cycles, etc., that could be employed, as will be apparent to one of skill. Thus, the embodiments of FIG. 39 can be used to transmit streams of digital information to the touch screen via button touching, and is not limited to actuating only in response to a button press. This may be advantageous for transmitting serial numbers, or other information that is advantageous to encode with more than one bit.

In one or more of the above embodiments, the button body and the frame are formed of similar materials.

With any of the above embodiments, the button assemblies may be used on a handheld device, such as an iPod, iPhone, or iPAD (all available from Apple, Inc. of Cupertino, Calif.). The portability of these devices is desirable. In one construction, the button assembly could be made as part of a case that would enclose the portable device. This would allow the device to both protect the iPod from falls or scratches, and would also provide the tactile feedback of the physical buttons or members. One embodiment of an enclosure would feature button assemblies on the front, but not on the back. The case would allow access to the touch-screen in either orientation. Two orientations are offered so that under normal use, the buttons or members do not interfere at all, but under other scenarios, the case can be flipped and the buttons assembly or assemblies can be used.

In related embodiments, the button assemblies could be part of what is typically called a 'screen protector'. This embodiment would both protect the screen from scratches, but would also provide the desired user interface.

Other button assembly configurations are also envisioned. For example, another embodiment may feature a button or member that can be pressed downwards onto the display screen, but can also be pushed laterally in the x or y directions. This would allow what is commonly referred to as 'button gestures'. The gestures allow an application to use a virtual button that can be pressed, but can also sense which way the user's finger was sliding when it was pressed.

Another embodiment features round button bodies that are made with multiple tiers of conductive rings. Each ring would contact at different time, and could be made to determine what amount of force the user is exerting. Another similar embodiment could use one conductive piece that would deform when pressed with force. The piece would deform such that the area contacting the touch-sensitive device increases with increasing force. This also could be used to determine what force the user was applying.

Although the present disclosure has been described with reference to preferred embodiments, workers skilled in the art will recognize that changes can be made in form and detail without departing from the spirit and scope of the present disclosure.

What is claimed is:

1. A button assembly for use with a touch sensitive display including a virtual controller, the button assembly comprising:
   a button body defining a contact face;
   a frame including an annular shoulder, a head, and post, wherein the head and the post project in opposite directions from the shoulder, the post terminating in a stop face opposite the head;
   wherein the button body is mounted over an exterior of the head; and
   a base defining a mounting face, a button face, and a central passage;
   wherein the annular shoulder aligns a central axis of the post with a central axis of the central passage and in a normal state, locates the contact face spaced from the button face;
   and further wherein the button assembly is mountable to a touch sensitive display screen, the frame being deflectable from the normal state in response to a user-applied force at the button body to bring the contact face into contact with the button face to generate a touch registering event at the touch sensitive display screen.

2. The button assembly of claim 1, wherein the button body is formed apart from the frame.

3. The button assembly of claim 2, wherein the button body and the frame are formed of an electrically conductive silicone material.

4. The button assembly of claim 3, wherein the frame and base are formed as an integral, homogenous structure.

5. The button assembly of claim 4, wherein the mounting face is highly polished.

6. The button assembly of claim 1, wherein the normal state includes the stop face being spaced above the mounting face.

7. The button assembly of claim 6, wherein the stop face forms a convex curve.

8. The button assembly of claim 1, wherein the button body is rotationally locked relative to the frame.

9. The button assembly of claim 1, wherein the button body forms a bore having a central aperture and opposing slots, and further wherein the head includes a pin and opposing keying structures, the pin configured to be received within the aperture and the keying structures configured to be received within the slots, respectively.

10. The button assembly of claim 1, wherein the base defines a primary perimeter shape and a lift tab projecting from the primary perimeter shape.

11. The button assembly of claim 1, wherein the base is provided as part of a substrate, the button assembly further comprising:
   a touch generating pad maintained by the substrate at a location spaced from the button body and the frame; and
   conductive traces maintained by the substrate and extending from the touch generating pad, the conductive traces adapted to electrically connected the button body with the touch generating pad in a deflected state of the frame;
   wherein a user-caused touch event at the button body is transferred to the touch generating pad via the conductive traces as is delivered by the touch generating pad to the touch sensitive display screen.

12. The button assembly of claim 11, wherein in the normal state of the frame, the button body is electrically isolated from the touch generating pad.

13. The button assembly of claim 11, wherein the touch generating pad is formed of an electrically conductive material.

14. A method of interfacing with an electronic device including a touch sensitive display screen, the method comprising:
   receiving a button assembly including a button body, a frame, and a base, the frame including an annular shoulder, a head, and a post, the button body mounted to the head, and the annular shoulder aligning a central axis of the post with a central axis of a central passage in the base;
   operating the electronic device to display a virtual controller on the touch sensitive display screen;
   mounting a mounting face of the button assembly to the touch sensitive display screen such that the button body is over the virtual controller, wherein in a normal state of the button assembly, a contact face of the button body is spaced from a button face of the base;
   deflecting the shoulder in response to a pressing force applied by a user on to the button body to direct the contact face into contact with the button face of the base, establishing a touch receptive interface between the contacted segment of the base and the touch sensitive display screen; and
   manipulating the button body by a user in a plurality of directions perpendicular to a centerline of the button body while the contact face continuously maintains the touch receptive interface with the base, wherein the manipulations correspond with a desired interaction by the user with the virtual controller.

15. The method of claim 14, wherein mounting face is defined by the base and self-adheres to the touch sensitive display screen.

16. The method of claim 15, wherein the base formed of a silicone-based material, and the mounting face is a highly polished surface.

17. The method of claim 14, wherein the step of manipulating the button body includes the user applying a rocking motion on to the button body.

18. The method of claim 14, wherein the step of manipulating the button body further includes toggling the contact face relative to base.

19. The method of claim 14, wherein the post terminates in a convexly curved stop face opposite the head.

20. The method of claim 14, wherein the button body is formed of an electrically conductive material.

* * * * *